(12) United States Patent
Dvorak

(10) Patent No.: US 7,155,402 B1
(45) Date of Patent: Dec. 26, 2006

(54) METHOD AND APPARATUS FOR DISTRIBUTION OF FASHION AND SEASONAL GOODS

(75) Inventor: Robert E. Dvorak, Atherton, CA (US)

(73) Assignee: Bluefire Systems, Inc., San Francisco, CA (US)

( * ) Notice: Subject to any disclaimer, the term of this patent is extended or adjusted under 35 U.S.C. 154(b) by 562 days.

(21) Appl. No.: 09/708,944

(22) Filed: Nov. 8, 2000

(51) Int. Cl.
G06F 17/60 (2006.01)

(52) U.S. Cl. .......................................... 705/10; 705/28

(58) Field of Classification Search ................... 705/10
See application file for complete search history.

(56) References Cited

U.S. PATENT DOCUMENTS

| | | | |
|---|---|---|---|
| 5,168,445 A | | 12/1992 | Kawashima et al. |
| 5,179,643 A | | 1/1993 | Homma et al. |
| 5,237,496 A | | 8/1993 | Kagami et al. |
| 5,377,095 A | | 12/1994 | Maeda et al. |
| 5,596,493 A | | 1/1997 | Tone et al. |
| 5,712,985 A | * | 1/1998 | Lee et al. .......................... 705/7 |
| 5,765,143 A | | 6/1998 | Sheldon et al. |
| 5,774,868 A | * | 6/1998 | Cragun et al. ................. 705/10 |
| 5,953,707 A | | 9/1999 | Huang et al. |
| 5,966,695 A | * | 10/1999 | Melchione et al. ........... 705/10 |
| 5,974,422 A | | 10/1999 | Kagami et al. |
| 6,029,139 A | * | 2/2000 | Cunningham et al. ........ 705/10 |
| 6,078,900 A | | 6/2000 | Ettl et al. |
| 6,151,582 A | | 11/2000 | Huang et al. |
| 6,341,269 B1 | | 1/2002 | Dulaney et al. |
| 6,370,509 B1 | | 4/2002 | Ross et al. |
| 6,434,544 B1 | * | 8/2002 | Bakalash et al. .............. 707/2 |
| 6,456,997 B1 | | 9/2002 | Shukla |
| 6,493,678 B1 | | 12/2002 | Foster et al. |
| 6,510,420 B1 | | 1/2003 | Cessna et al. |
| 6,609,101 B1 | * | 8/2003 | Landvater ..................... 705/10 |
| 6,622,125 B1 | * | 9/2003 | Cragun et al. ................ 705/14 |
| 6,834,266 B1 | | 12/2004 | Kumar et al. |
| 2002/0147630 A1 | | 10/2002 | Rose et al. |
| 2003/0074251 A1 | | 4/2003 | Kumar et al. |
| 2003/0229502 A1 | | 12/2003 | Woo |

FOREIGN PATENT DOCUMENTS

| | | |
|---|---|---|
| JP | 2002-073951 | 3/2002 |
| WO | WO 9715023 A2 * | 4/1997 |

OTHER PUBLICATIONS

"TSI (Strategiy Strategy Incorporated)"; www.grossprofit.com.*
Ackerman, Jerry, "Looking Back to Fashion's Future", The Boston Globe, Oct. 7, 1998 [retrieved Sep. 9, 2004], pp. 1-3, retrieved from Google.com and archive.org.

(Continued)

Primary Examiner—Romain Jeanty
(74) Attorney, Agent, or Firm—Ernest J. Beffel, Jr.; Haynes Beffel & Wolfeld LLP

(57) ABSTRACT

One embodiment practicing aspects of the present invention provides a computer-implemented method for adjusting a reference selling profile for a reference product, comprising retrieving one or more reference selling profiles corresponding to daily or more frequent historical data for one or more reference products, and adjusting the reference selling profiles to correct for one or more promotions which impacted the historical data. Other embodiments and aspects provide for determining location distribution shares, projecting sales, determining distribution quantities, comparing alternative markdown scenarios, etc.

53 Claims, 14 Drawing Sheets

OTHER PUBLICATIONS

Kumar, Mahesh et al., Clustering Seasonality Patterns in the Presence of Errors, Paper 155, May 2002, http://ebusiness.mit.edu.

Kumar, Mahesh, Error-based Clustering and Its Application to Sales Forecasting in Retail Merchandising, Sep. 2003, Massachusetts Institute of Technology.

Montgomery, Alan, The Implementation Challenge of Pricing Decision Support Systems for Retail Managers, Oct. 2003, Pittsburgh, PA.

Sen, Alper, The U.S. Apparel Industry, Apparel Review, Oct. 2004, Dept. of Industrial Engineering, Bilkent Univ., Bilkent, Ankara, Turkey.

Screenshots, www.grossprofit.com, Oct. 18, 20000 [retrieved Sep. 9, 2004], pp. 1-9. retrieved from: archive.org and google.com.

Koloszyc, Ginger, "Merchants Try Complex Math Tools to Improve Inventory Decisions", Stores Magazine, Nov. 1998 [retrieved Sep. 9, 2004], pp. 1-3, retrieved from Archive.org and Google.com.

Hauge et al., "*How Low Can You Go? Using Simulation to Determine Appropriate Inventory Levels*", attributed to IIE Lean Management Solutions, Sep. 23-24, 2002, Seattle, WA, (publication data unverified) <http://www.novasim.com/downloads/How%20Low%20Can%20You%20Go.pdf>, accessed Jan. 10, 2005.

Lin et al., "*Extended-Enterprise Supply-Chain Management at IBM Personal Systems Group and Other Divisions*", Interfaces 30:1, pp. 7-25, at pp. 12-13 (Jan.-Feb. 2000) available at <http://www.interfaces.smeal.psu.edu/pdf/v30n1a2.pdf>.

\* cited by examiner

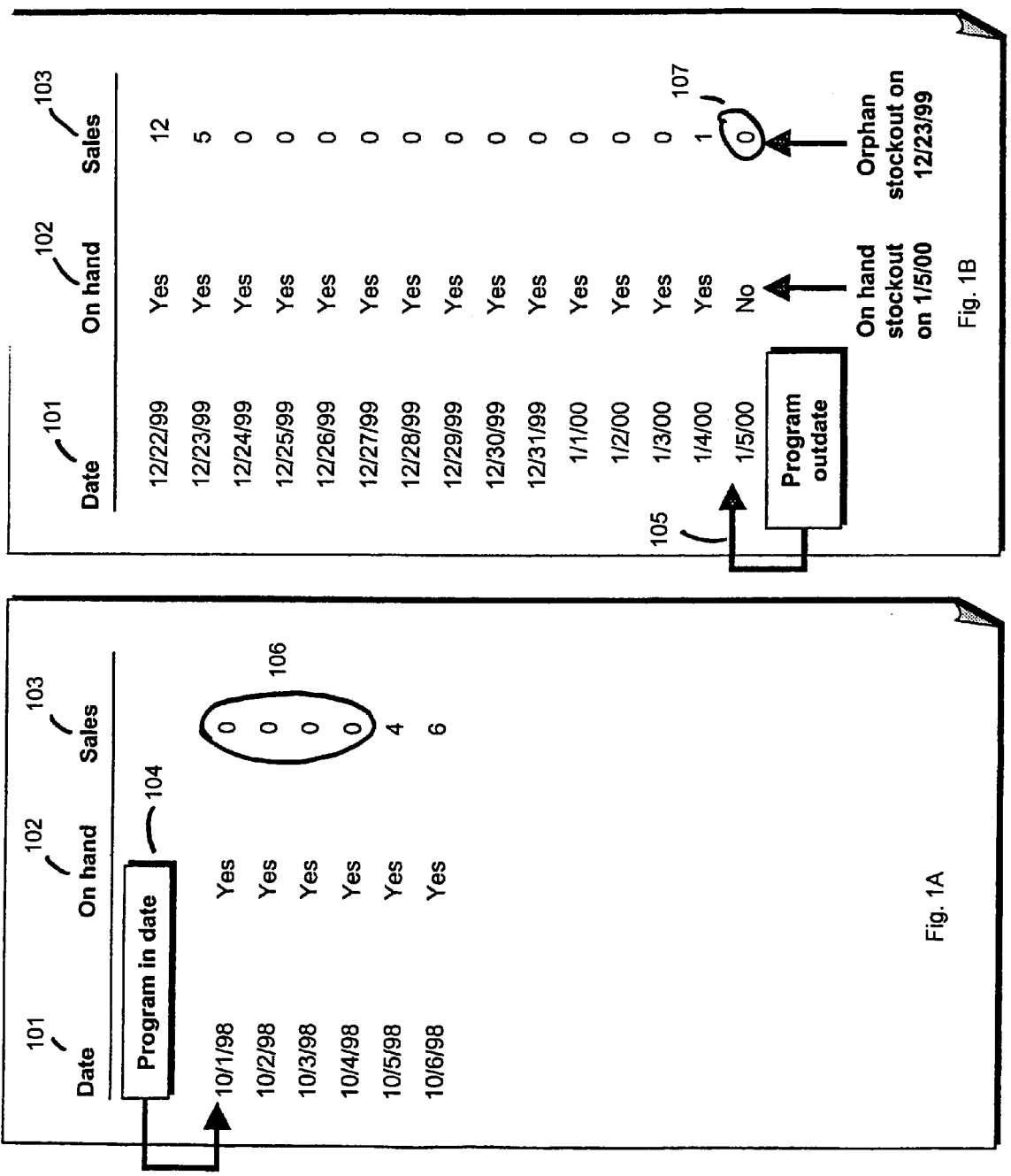

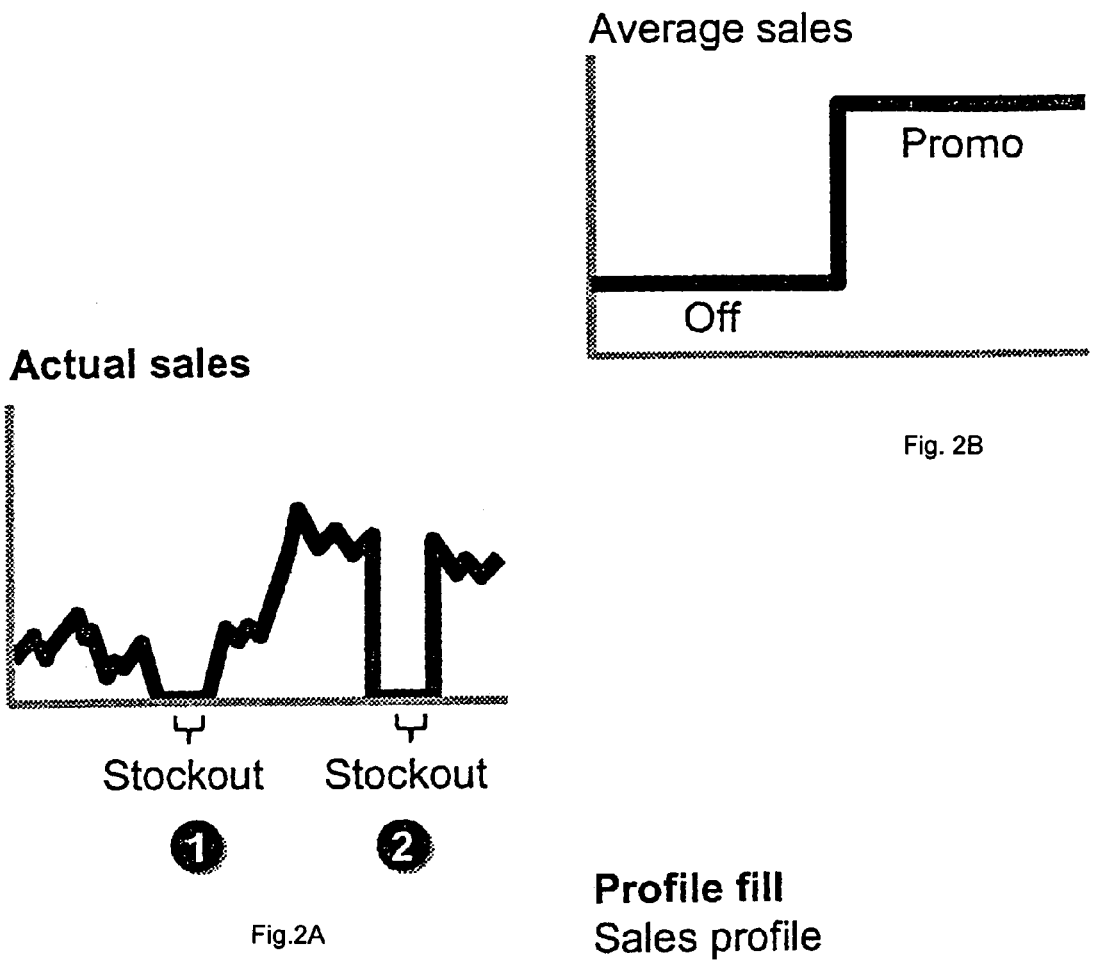
Fig. 2B
Fig.2A
Fig 2C

| Location | Location Name | Unit Fraction |
|---|---|---|
| 0001 | BROADWAY 1 | 0.00681708 |
| 0002 | PARAMUS | 0.00649245 |
| 0003 | TYSON'S CORNER | 0.00827788 |
| 0004 | MONTGOMERY MALL | 0.00486934 |
| 0005 | LEXINGTON | 0.00584321 |
| 0006 | NEW MADISON AVENUE | 0.00486934 |
| 0007 | BROADWAY 2 | 0.00714170 |
| 0008 | ROCKAWAY | 0.00470703 |
| 0009 | GEORGETOWN | 0.00324623 |
| 0010 | EMERALD SQUARE | 0.00389547 |
| 0011 | WOODBRIDGE | 0.00600552 |
| 0012 | MALL OF NEW HAMPSHIRE | 0.00097387 |
| 0013 | FASHION CENTER | 0.00811557 |
| 0014 | MANHATTAN MALL | 0.01119948 |
| 0016 | STATEN ISLAND | 0.00714170 |
| 0017 | LAKESIDE MALL | 0.00292160 |
| 0018 | PHEASANT LANE | 0.00405778 |
| 0019 | WILLOWBROOK, NJ | 0.00876481 |
| 0020 | SOUTH STREET | 0.00275929 |
| 0021 | FAIRLANE TOWN CENTER | 0.00373316 |
| 0022 | TWELVE OAKS | 0.00535627 |

Fig. 4

| Date | Unit Fraction |
|---|---|
| 1/31/99 | 0.00143485 |
| 2/1/99 | 0.00143485 |
| 2/2/99 | 0.00143485 |
| 2/3/99 | 0.00143485 |
| 2/4/99 | 0.00143485 |
| 2/5/99 | 0.00143485 |
| 2/6/99 | 0.00143485 |
| 2/7/99 | 0.00143485 |
| 2/8/99 | 0.00143485 |
| 2/9/99 | 0.00143485 |
| 2/10/99 | 0.00143485 |
| 2/11/99 | 0.00143485 |
| 2/12/99 | 0.00143485 |
| 2/13/99 | 0.00143485 |
| 2/14/99 | 0.00143485 |
| 2/15/99 | 0.00143485 |
| 2/16/99 | 0.00143485 |
| 2/17/99 | 0.00143485 |
| 2/18/99 | 0.00143485 |
| 2/19/99 | 0.00143485 |
| 2/20/99 | 0.00143485 |
| 2/21/99 | 0.00143485 |

Fig. 5

FASHION MODEL STOCK REPORT: ONE ITEM ALL LOCATIONS
12019 NATURAL FACE ENHANCER

| STS Location Number | STS Location Description | In Date | Out Date | Activity Cycle End | Profile Name | STD (units) | Run Share (percent) | Gour Sales Share (percent) | Interways Share (percent) | Cumulative Model Stock (units) | Cumulative Sales thru (units) |
|---|---|---|---|---|---|---|---|---|---|---|---|
| 1 | BROADWAY 1 | 3/4/00 | 9/30/00 | 9/30/00 | Space Jun | 0 | 0.007915 | 0.008251 | 0.007915 | 94.97428 | 0 |
| 2 | PARAMUS | 3/4/00 | 9/30/00 | 9/30/00 | Space Jun | 0 | 0.001979 | 0.003525 | 0.001979 | 23.74357 | 0 |
| 3 | TYSON'S CORNER | 3/4/00 | 9/30/00 | 9/30/00 | Space Jun | 0 | 0.004296 | 0.006178 | 0.004296 | 51.55747 | 0 |
| 4 | MONTGOMERY MALL | 3/4/00 | 9/30/00 | 9/30/00 | Space Jun | 0 | 0.002996 | 0.002985 | 0.002996 | 35.95455 | 0 |
| 5 | LEXINGTON | 3/4/00 | 9/30/00 | 9/30/00 | Space Jun | 0 | 0.005597 | 0.006214 | 0.005597 | 67.16038 | 0 |
| 6 | NEW MADISON AVENUE | 3/4/00 | 9/30/00 | 9/30/00 | Space Jun | 0 | 0.006727 | 0.006717 | 0.006727 | 80.72814 | 0 |
| 7 | BROADWAY 2 | 3/4/00 | 9/30/00 | 9/30/00 | Space Jun | 0 | 0.007293 | 0.006687 | 0.007293 | 87.51201 | 0 |
| 8 | ROCKAWAY | 3/4/00 | 9/30/00 | 9/30/00 | Space Jun | 0 | 0.00277 | 0.003761 | 0.00277 | 33.241 | 0 |
| 9 | GEORGETOWN | 3/4/00 | 9/30/00 | 9/30/00 | Space Jun | 0 | 0.004636 | 0.003871 | 0.004636 | 55.62779 | 0 |
| 10 | EMERALD SQUARE | 3/4/00 | 9/30/00 | 9/30/00 | Space Jun | 0 | 0.0026 | 0.002862 | 0.0026 | 31.20583 | 0 |
| 11 | WOODBRIDGE | 3/4/00 | 9/30/00 | 9/30/00 | Space Jun | 0 | 0.003957 | 0.005198 | 0.003957 | 47.48714 | 0 |
| 12 | MALL OF NEW HAMPSHIRE | 3/4/00 | 9/30/00 | 9/30/00 | Space Jun | 0 | 0.003618 | 0.002337 | 0.003618 | 43.41681 | 0 |
| 13 | FASHION CENTER | 3/4/00 | 9/30/00 | 9/30/00 | Space Jun | 0 | 0.004014 | 0.008657 | 0.004014 | 48.16553 | 0 |
| 14 | MANHATTAN MALL | 3/4/00 | 9/30/00 | 9/30/00 | Space Jun | 0 | 0.008932 | 0.011559 | 0.008932 | 107.1853 | 0 |
| 15 | STATEN ISLAND | 3/4/00 | 9/30/00 | 9/30/00 | Space Jun | 0 | 0.004523 | 0.003954 | 0.004523 | 54.27102 | 0 |
| 16 | LAKESIDE MALL | 3/4/00 | 9/30/00 | 9/30/00 | Space Jun | 0 | 0.002205 | 0.003923 | 0.002205 | 26.45712 | 0 |
| 17 | PHEASANT LANE | 3/4/00 | 9/30/00 | 9/30/00 | Space Jun | 0 | 0.002544 | 0.002619 | 0.002544 | 30.52745 | 0 |
| 18 | WILLOWBROOK, NJ | 3/4/00 | 9/30/00 | 9/30/00 | Space Jun | 0 | 0.004127 | 0.006049 | 0.004127 | 49.5223 | 0 |
| 19 | SOUTH STREET | 3/4/00 | 9/30/00 | 9/30/00 | Space Jun | 0 | 0.004466 | 0.004645 | 0.004466 | 53.59263 | 0 |
| 20 | FAIRLANE TOWN CENTER | 3/4/00 | 9/30/00 | 9/30/00 | Space Jun | 0 | 0.00147 | 0.002879 | 0.00147 | 17.63808 | 0 |
| 21 | TWELVE OAKS | 3/4/00 | 9/30/00 | 9/30/00 | Space Jun | 0 | 0.00277 | 0.004052 | 0.00277 | 33.241 | 0 |
| 22 | BURLINGTON MALL | 3/4/00 | 9/30/00 | 9/30/00 | Space Jun | 0 | 0.006614 | 0.007451 | 0.006614 | 79.37136 | 0 |
| 23 | WHITE MARSH | 3/4/00 | 9/30/00 | 9/30/00 | Space Jun | 0 | 0.002148 | 0.002741 | 0.002148 | 25.77873 | 0 |

Fig. 8

| | A | B | C | D | E | F | G | H | I | J | K | L | M | N | O | P |
|---|---|---|---|---|---|---|---|---|---|---|---|---|---|---|---|---|
| | | | Next Distribution Date | | In Date | Out Date | Activity Cycle End | Cumulative Provisional Model Stock (units) | Shipment Total (units) | Desired Shipment Case (units) | Case Rounded Shipment (units) | Shipment (cases) | PO Minimum (cases) | Case Pack Minimum | Insufficient PO | |
| | | STS Location Description | | | | | | | | | | | | | | |
| 1 | BROADWAY 1 | 1/24/00 | Last Distro | 3/4/00 | 9/30/00 | 9/30/00 | 94.9743 | 0 | 94.9743 | 94 | 94 | Y | Y | N | | |
| 2 | PARAMUS | 1/24/00 | Last Distro | 3/4/00 | 9/30/00 | 9/30/00 | 23.7436 | 0 | 23.7436 | 24 | 24 | Y | Y | N | | |
| 3 | TYSONS CORNER | 1/24/00 | Last Distro | 3/4/00 | 9/30/00 | 9/30/00 | 51.5575 | 0 | 51.5575 | 51 | 51 | Y | Y | N | | |
| 4 | MONTGOMERY MALL | 1/24/00 | Last Distro | 3/4/00 | 9/30/00 | 9/30/00 | 35.9545 | 0 | 35.9545 | 36 | 36 | Y | Y | N | | |
| 5 | LEXINGTON | 1/24/00 | Last Distro | 3/4/00 | 9/30/00 | 9/30/00 | 67.1604 | 0 | 67.1604 | 67 | 67 | Y | Y | N | | |
| 6 | NEW MADISON AVENUE | 1/24/00 | Last Distro | 3/4/00 | 9/30/00 | 9/30/00 | 80.7281 | 0 | 80.7281 | 80 | 80 | Y | Y | N | | |
| 7 | BROADWAY 2 | 1/24/00 | Last Distro | 3/4/00 | 9/30/00 | 9/30/00 | 87.512 | 0 | 87.512 | 87 | 87 | Y | Y | N | | |
| 8 | ROCKAWAY | 1/24/00 | Last Distro | 3/4/00 | 9/30/00 | 9/30/00 | 33.241 | 0 | 33.241 | 33 | 33 | Y | Y | N | | |
| 9 | GEORGETOWN | 1/24/00 | Last Distro | 3/4/00 | 9/30/00 | 9/30/00 | 55.6278 | 0 | 55.6278 | 56 | 56 | Y | Y | N | | |
| 10 | EMERALD SQUARE | 1/24/00 | Last Distro | 3/4/00 | 9/30/00 | 9/30/00 | 31.2058 | 0 | 31.2058 | 31 | 31 | Y | Y | N | | |
| 11 | WOODBRIDGE | 1/24/00 | Last Distro | 3/4/00 | 9/30/00 | 9/30/00 | 47.4871 | 0 | 47.4871 | 47 | 47 | Y | Y | N | | |
| 12 | MALL OF NEW HAMPSHIRE | 1/24/00 | Last Distro | 3/4/00 | 9/30/00 | 9/30/00 | 43.4168 | 0 | 43.4168 | 43 | 43 | Y | Y | N | | |
| 13 | FASHION CENTER | 1/24/00 | Last Distro | 3/4/00 | 9/30/00 | 9/30/00 | 48.1655 | 0 | 48.1655 | 48 | 48 | Y | Y | N | | |
| 14 | MANHATTAN MALL | 1/24/00 | Last Distro | 3/4/00 | 9/30/00 | 9/30/00 | 107.185 | 0 | 107.185 | 106 | 106 | Y | Y | N | | |
| 16 | STATEN ISLAND | 1/24/00 | Last Distro | 3/4/00 | 9/30/00 | 9/30/00 | 54.271 | 0 | 54.271 | 54 | 54 | Y | Y | N | | |
| 17 | LAKESIDE MALL | 1/24/00 | Last Distro | 3/4/00 | 9/30/00 | 9/30/00 | 26.4571 | 0 | 26.4571 | 27 | 27 | Y | Y | N | | |
| 18 | PHEASANT LANE | 1/24/00 | Last Distro | 3/4/00 | 9/30/00 | 9/30/00 | 30.5274 | 0 | 30.5274 | 31 | 31 | Y | Y | N | | |
| 19 | WILLOWBROOK, NJ | 1/24/00 | Last Distro | 3/4/00 | 9/30/00 | 9/30/00 | 49.5223 | 0 | 49.5223 | 49 | 49 | Y | Y | N | | |
| 20 | SOUTH STREET | 1/24/00 | Last Distro | 3/4/00 | 9/30/00 | 9/30/00 | 53.5926 | 0 | 53.5926 | 54 | 54 | Y | Y | N | | |
| 21 | FAIRLANE TOWN CENTER | 1/24/00 | Last Distro | 3/4/00 | 9/30/00 | 9/30/00 | 17.6381 | 0 | 17.6381 | 18 | 18 | Y | Y | N | | |
| 22 | TWELVE OAKS | 1/24/00 | Last Distro | 3/4/00 | 9/30/00 | 9/30/00 | 33.241 | 0 | 33.241 | 33 | 33 | Y | Y | N | | |
| 23 | BURLINGTON MALL | 1/24/00 | Last Distro | 3/4/00 | 9/30/00 | 9/30/00 | 79.3714 | 0 | 79.3714 | 79 | 79 | Y | Y | N | | |
| 24 | WHITE MARSH | 1/24/00 | Last Distro | 3/4/00 | 9/30/00 | 9/30/00 | 25.7787 | 0 | 25.7787 | 26 | 26 | Y | Y | N | | |
| 25 | FREEHOLD | 1/24/00 | Last Distro | 3/4/00 | 9/30/00 | 9/30/00 | 28.4923 | 0 | 28.4923 | 29 | 29 | Y | Y | N | | |
| 26 | CHICAGO PLACE | 1/24/00 | Last Distro | 3/4/00 | 9/30/00 | 9/30/00 | 50.8791 | 0 | 50.8791 | 51 | 51 | Y | Y | N | | |
| 28 | CITY CENTER | 1/24/00 | Last Distro | 3/4/00 | 9/30/00 | 9/30/00 | 31.8842 | 0 | 31.8842 | 32 | 32 | Y | Y | N | | |
| 29 | TOWER CITY | 1/24/00 | Last Distro | 3/4/00 | 9/30/00 | 9/30/00 | 24.422 | 0 | 24.422 | 25 | 25 | Y | Y | N | | |
| 31 | BRIARWOOD MALL | 1/24/00 | Last Distro | 3/4/00 | 9/30/00 | 9/30/00 | 44.7736 | 0 | 44.7736 | 45 | 45 | Y | Y | N | | |
| 34 | CHERRY HILL | 1/24/00 | Last Distro | 3/4/00 | 9/30/00 | 9/30/00 | 25.7787 | 0 | 25.7787 | 26 | 26 | Y | Y | N | | |
| 35 | CLACKAMAS TOWN CENTER | 1/24/00 | Last Distro | 3/4/00 | 9/30/00 | 9/30/00 | 40.7033 | 0 | 40.7033 | 41 | 41 | Y | Y | N | | |
| 36 | BUCKLAND HILLS | 1/24/00 | Last Distro | 3/4/00 | 9/30/00 | 9/30/00 | 30.5274 | 0 | 30.5274 | 31 | 31 | Y | Y | N | | |

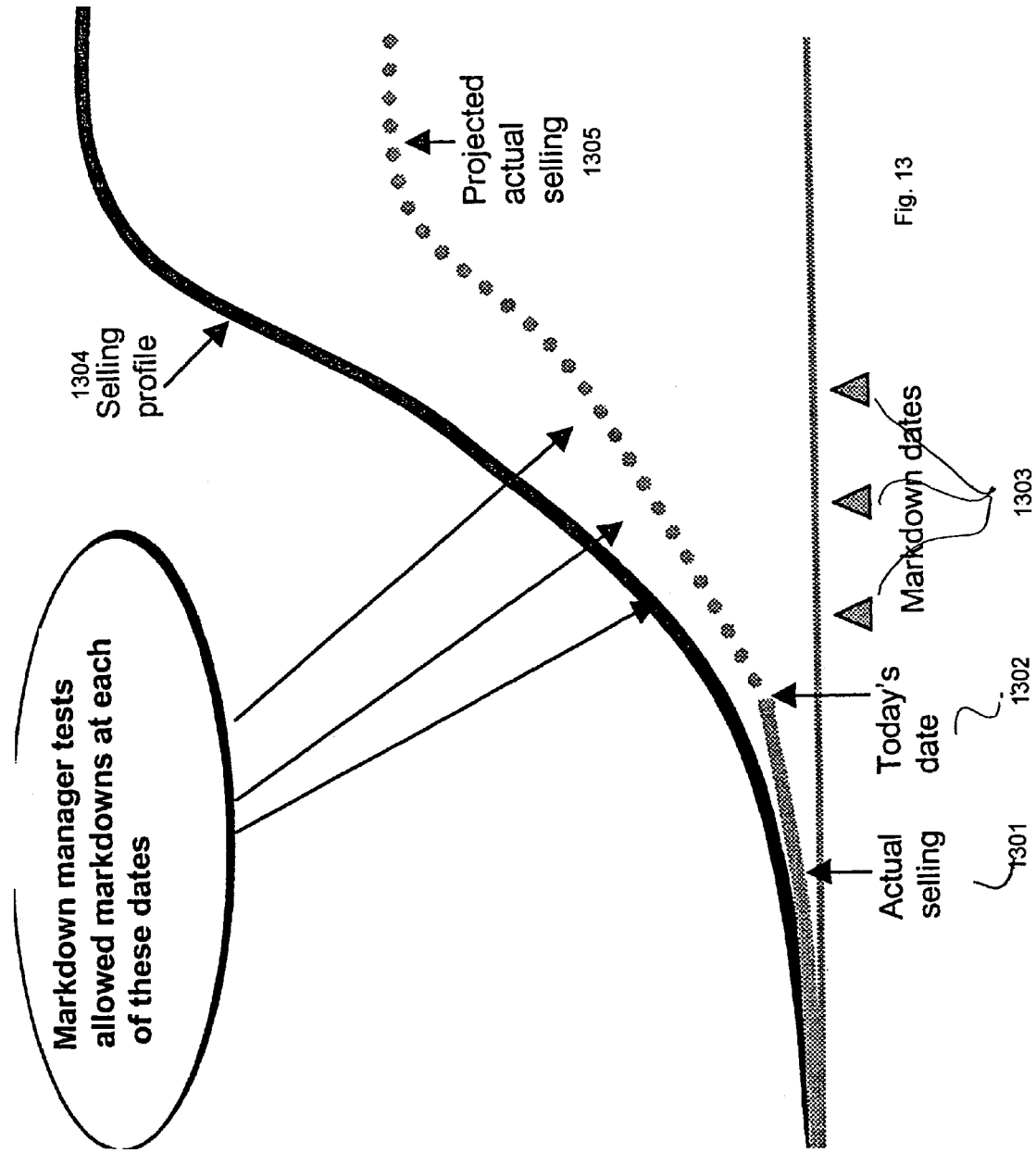

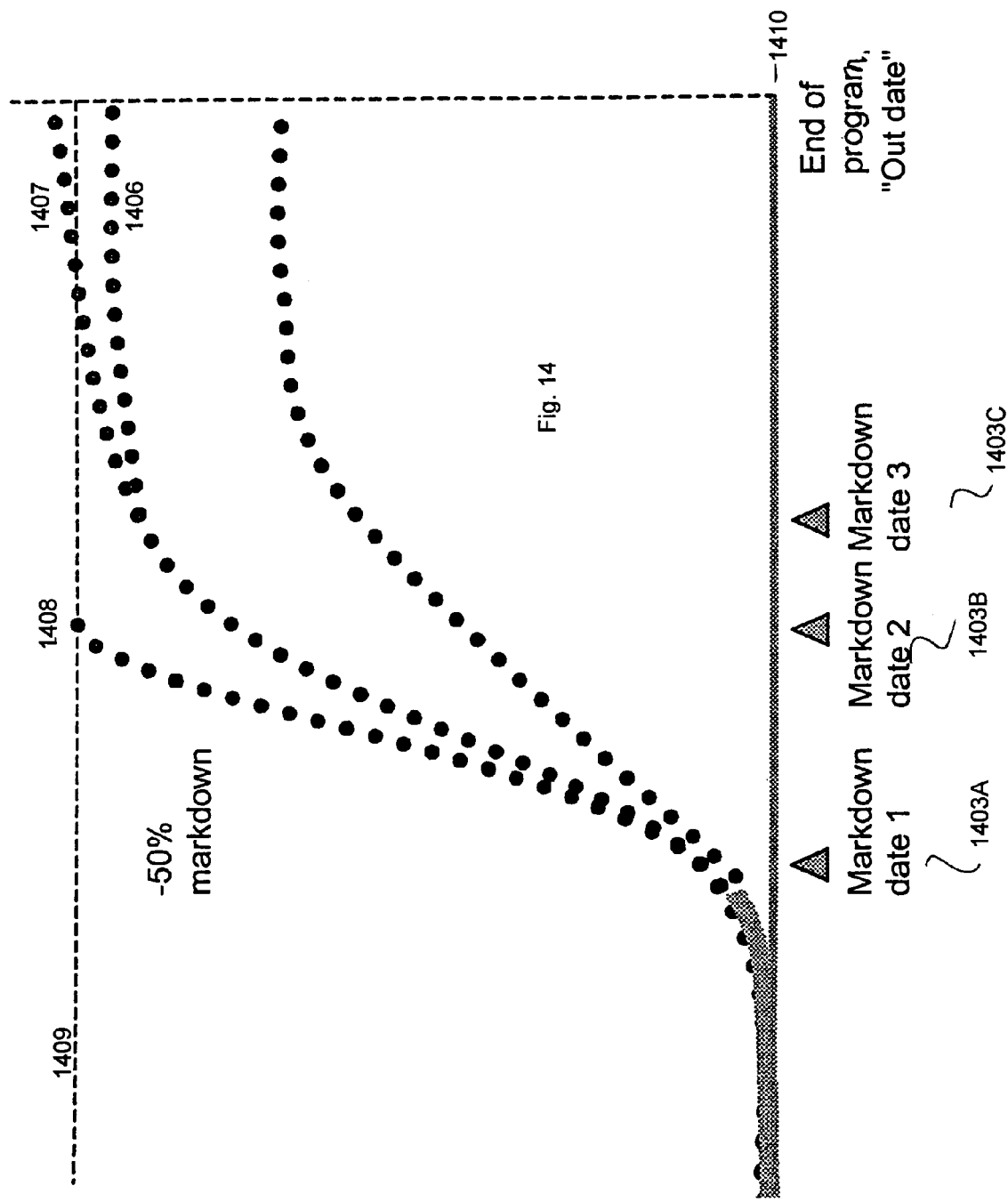

METHOD AND APPARATUS FOR DISTRIBUTION OF FASHION AND SEASONAL GOODS

BACKGROUND OF THE INVENTION

Allocation of goods among locations in a retail chain involves significant stakes for operators, particularly for fashion or seasonal goods. A fashion program typically consists of a number of items that will be sold for a fixed period of time. For each item, the retailer typically purchases a fixed number of units in advance and may not have the opportunity to reorder the item from the supplier. During the selling season, the retailer needs to send product from its distribution center to each of its locations to ensure that locations are in-stock in as many items as possible. As the end of the selling period approaches, retailers typically reduce the price of unsold items (markdowns) to ensure that all or substantially all of the inventory associated with the program is sold at or near the end date of the program.

Determining the appropriate quantity of each item to send to each location involves a number of considerations. It is useful to predict the rate of sales over any period of time during a fashion or seasonal program, but this is difficult as sales rates vary during the program. For example, in a holiday program, the sales rate in the week before Christmas may substantially exceed the sales rate the week prior. The relationship between sales rates in these two weeks may vary by product category, price point, or other factors. Determining the characteristic shape of the selling profile over time is difficult because of calendar differences between years and different promotional events from year to year.

Actual sales in particular locations vary widely from planned sales. Many locations may have small sales volumes, at least for specific items. Random variations in sales have a substantial impact on small sales volumes. Therefore, it is useful for an allocation algorithm to reflect the randomness of sales at specific locations, to avoid excess inventory in some locations and lost sales opportunities in other locations.

Retailers may designate presentation quantities for each location and item. Presentation quantities are quantities adapted to a fixture or a location display goods to present attractively. It is useful for an allocation methodology to ensure that location presentation quantities are provided at the outset and maintained. Because retailers sell all of the product purchased for a program, location on-hand quantities eventually fall below the presentation quantity. The longer the location presentation quantity can be maintained, the more attractive the program appears to customers. In the case of coordinated products like a matching dress, blouse and vest keeping the presentation quantities for all of the products coordinated is also useful. It may be helpful to adjust and reduce presentation quantities as overall inventory is depleted or as a close out date approaches, to avoid excess stock in lower volume locations and lost sales opportunities at higher volume locations.

SUMMARY OF THE INVENTION

One embodiment practicing aspects of the present invention provides a computer-implemented method for adjusting a reference selling profile for a reference product, comprising retrieving one or more reference selling profiles corresponding to daily or more frequent historical data for one or more reference products, and adjusting the reference selling profiles to correct for one or more promotions which impacted the historical data. Other embodiments and aspects of the present invention are described in below and set forth in the claims.

BRIEF DESCRIPTION OF THE DRAWINGS

FIG. 1 illustrates handling of a causal events which resulted in an artifact in historical data.

FIG. 2 graphically illustrates handling of the stockout causal event which resulted in an artifact in historical data.

FIG. 4 illustrates an interface for displaying the relative shares of locations or locations in product sales.

FIG. 5 illustrates interface for displaying day-by-day diagnostic sales profiles, which sum to 1.0 over the selling period.

FIG. 8 illustrates an interface for reporting a model stock of a particular item across all locations.

FIG. 9 illustrates interface for reporting distribution of particular item across all locations.

FIG. 12 illustrates an interface for selection of markdowns.

FIGS. 13 and 14 graphically depict aspects of a markdown manager.

DETAILED DESCRIPTION

Figure 3:
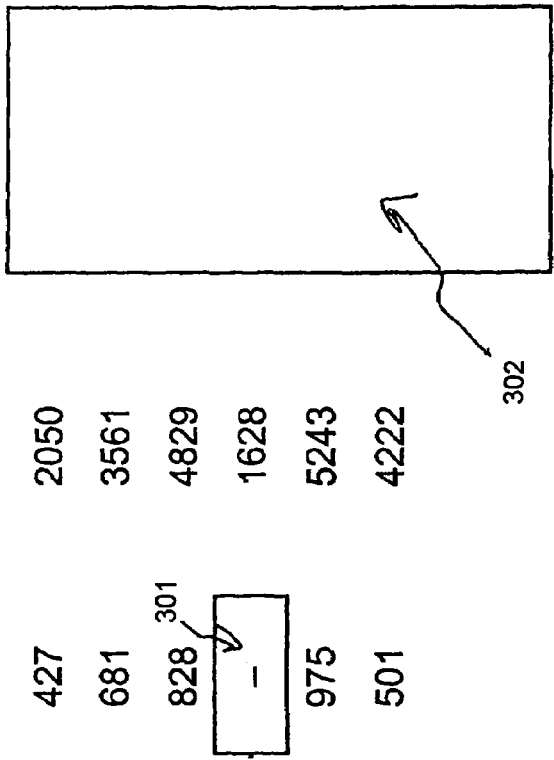
FIG. 3 depicts historical corrections by assortment fill.

The following detailed description is made with reference to the figures. Preferred embodiments are described to illustrate the present invention, not to limit its scope, which is defined by the claims. Those of ordinary skill in the art will recognize a variety of equivalent variations on the description that follows.

I. The Fashion Allocation System Overview

A fashion allocation system embodying aspects of the present invention forecasts sales and calculates allocation quantities for each distribution flow from a distribution center to locations in a fashion or seasonal program. While the fashion allocation system does not determine required vendor order quantities (also known as the total buy), the system can be used to generate information useful in determining the order quantity, especially if a product comes in many sizes, colors, flavors or other distinction where past location or other selling profiles are relevant. Ultimately, the total buy quantity decision is driven by a planning function and merchant assessments. After the decision on the total buy is complete, the fashion allocation system provides information useful in determining where and when to send the goods.

The fashion allocation system can take advantage of historical data for comparable items and then real sales as they become available. Historical data on a reference product helps forecast how the different locations will sell the different items. Using well-selected historical reference product(s) provides insights into sales quantities and sales timing by location on a relative basis. These insights can be adjusted based on actual in-season sales results. The fashion allocation system may be used to combine the historical and real sales results. A reference product may be an individual product, for instance a product comparable to a particular product for which sales are being forecast, or it may be constructed based on user judgment or from a group of individual products.

In operating the fashion allocation system there are 5 activities, which involve several distinct aspects of the present invention:

1. Create Shares
2. Create Profiles
3. Setup Item and Location Data
4. Setup PQs and Causal Calendar
5. Run Distributions The first 4 activities are typically done once for each fashion or seasonal program and then changed if required. The fifth activity, running distributions, is typically done multiple times over the season.

The fashion allocation system can use both historical reference product information and actual sales results in its forecasting, allocations and distributions. The historical information is used in the form of shares and sales profiles, which are built for the new products using the reference products. Then item and location data and quantities (PQs) and a causal event calendar are set up. The casual event calendar can be used to capture promotional information such as advertising, preferential display of goods and price reductions or seasonal data such as the days preceding and following Christmas, the days preceding and including Valentines Day and the days preceding the start of school (typically called "back to school"), which can be used to adjust either shares or profiles. With this information in place, distributions can be run. Once in-season sales are available, shares, profiles and distribution runs may reflect both projections and actual sales. This blending of projections and in-season results is done in a way to not over react to random selling anomalies while not under reacting to real differences in what was expected and what is actually happening in the new item selling.

A share or location distribution share is a set of location-by-location sales fractions adding to 1.0, where a locations' fraction is an estimate of its unit sales relative to the total unit sales of all locations. Shares typically, but not always, are calculated for groups of items instead of single items, so that the location level sales do not reflect individual anomalistic situations such as random selling noise. Shares can be generated using a number of different historical sales periods (e.g., all the sales time for the historical items or just during a specified time period) and sales types (e.g., actual sales or stock out filled sales). One share is typically assigned to an item, and many items may use the same share. Shares should differ for items that sell differently across the locations. For example, some locations may be strong sellers at high price points and therefore if the item in question is at a high price point, a high price point share may be used.

A reference selling profile is a historical set of data corresponding to day-by-day or more frequent sales for reference product(s). Typically, the historical sales data is stored as fractions adding to 1.0, where a daily sales fraction is the fraction of season unit sales that would occur on that day. Alternatively, a reference selling profile may store actual historical unit or dollar sales data, with appropriate scaling, as will be apparent to those of ordinary skill in the art. However the data is stored, the invention can readily be adapted to historical data retained for intervals more frequent than daily, for instance, for three shifts a day. Like a share, a profile is typically determined for a number of past items so that the location level sales do not reflect individual anomalistic situations. Unlike shares, profiles typically are grouped by locations. In grouping locations, it is preferred to select a group sufficiently large to overcome random selling noise but not so large as to blend together locations with different sales patterns. For locations that sell large quantities of particular items, grouping may be unnecessary.

The profile created may be adjusted to reflect to a new time period corresponding to when the new items will be sold. So for example, a profile created for a first year during Thanksgiving and Christmas holiday may be shift to a second year reflecting the different days of the week and timing of events such as Thanksgiving. Likewise, a profile created in a first year in the spring may be time shifted for use in a second year during the summer. In making these types of changes a reference selling profile may be truncated to a shorter selling period by dropping early or late sales dates and then resealing the remaining days to more closely match the sales dates that are being projected rescaling the profile, if desired, to sum to 1. Alternatively, the reference profile may be compressed to a shorter period rather than dropping dates. For in-season selling situations profiles may be changed in a way that they scale to a value greater or smaller than 1 reflecting whether unpromoted sales of a particular product should sell out a total buy quantity during the defined selling season (in cases where they will no markdowns are required or the season will take longer than planned). Profiles may be assigned at the item and location level or to groups of items or groups of locations. A number of items and locations may have the same profile. Profiles may be adjusted to reflect timing difference among locations in product sales. For example, locations in areas like Florida or Arizona often have sales profiles influenced by seasonal influxes of people. Locations in some geographies may have different day of week and week of year variations in selling. Profiles for a specific location may also differ by price point or by type of goods.

Profiles also may be adjusted to correct for seasonal effects which impacted sales of reference product(s). One seasonal effect is special selling days, such as the days before Mother's Day, Memorial Day weekend, the days before and after Thanksgiving, the days before and after Christmas. Depending on the product or location, any number of other special selling days may produce seasonal effects. Another seasonal effect is periods such as back to school days and Christmas shopping. Depending on the product or location, any number of other special periods may produce seasonal effects.

Corrections made to create shares can be applied to adjust reference selling profiles to generate projected sales profiles and vice-a-versa.

Once a share for an item and one or more profiles for locations have been selected, setup can proceed for specific items and locations. This may include setting the data elements that should remain the same throughout the distributions or change infrequently. These elements include the authorized locations for an item, the item buy quantity available for distribution over the life of the program and the in and out dates for the item at each specific location (if it differs by location). These may all be specified at the item or item/location level, as desired, and then are used by the system throughout the distributions. This data is typically modified if, as the selling progresses, if it becomes apparent that an incorrect share or profile was selected initially.

The presentation quality (PQ) and causal calendar are used to identify which promotional events will occur at each location and which items will be affected. Promotions, in this sense, may include advertising, preferential display or presentation of products, markdowns and the like. The PQs specify a desired quantity of inventory presentation in a location to be aesthetically pleasing. It can be specified on an item, location, and day basis (i.e., need to have 12 on hand in location number 62 to display from December 5$^{th}$ to December 12$^{th}$.) The causal calendar identifies promotional events (again, on a location, item, date basis) that will affect each item during the life of the fashion or seasonal program (i.e., item number 876 will be on 25% price reduction from December 1$^{st}$ through December 7$^{th}$ at these specified locations). The causal calendar will also identify the expected sales lift associated with the event (e.g., a 2× multiple of normal selling) and may use a value that is user a specified or historically derived.

Distributions can be run and reports generated after setup. The distributions suggest actual allocation quantities for each location, given the appropriate profile, share, actual selling, presentation quantity requirements, causal calendar, and total buy for the product. These distribution results are typically uploaded to another system for distribution center picking and shipping to locations.

II. Create Shares

One aspect of the fashion allocation system is an historical share. To recap, a share is an historical set of location-by-location sales fractions adding to 1.0, where a locations' fraction is an estimate of its unit sales relative to the total unit sales, typically over the total season. A single share typically, but not always, is created using a group of items, so that the location level sales do not reflect individual anomalistic situations such as random selling noise.

A share is created using historical sales data, which may previously have been loaded into the fashion allocation system. It is useful to select a set of past items with selling drivers similar to the selling drivers for the new items for which the shares being created. The right time period to use and type of sales (actual or filled) also may be taken into account when selecting historical data with which to create a share.

Selection of raw historical data is accompanied by selection of desired historical corrections. This includes selecting a type of stock out or out of stock correction method to use and a type of filling. Other corrections may include correction for promotions, including corrections on a location-by-location basis, and correction for seasonal effects. After the selections are made, the fashion allocation system can generate a share to which the user may assign a unique name.

A share is typically, but not always, built up from the historical sales of a number of historical items or reference selling profiles. For each of those items it uses the actual unit sales, on hand inventory (if selected and available for determining stock outs) and information from the causal calendar. In building the share, the fashion allocation system may remove the past impacts reflected in the causal calendar so that different promotions done across different locations (if it was done that way) or different impacts of seasonality do not influence the calculated shares. Such promotions may include advertising, preferential display or reduced pricing of reference product(s). Such seasonality may include different holiday periods such as Christmas, Easter and Mothers Day and other periods like "Back to School". Once a share has been constructed, it can be automatically adjusted to reflect future promotions or seasonality entered into the system on a location-by-location or higher-level basis (e.g., regional or total item).

The fashion allocation system enables user selection of past items that are expected to sell in the same manner as new items. The user's thinking should take into account a number of factors such as target consumers, price point, fashion ability, branding, and size selling. In addition, it is some times necessary to think about factors such as male to female crossover sales or cross assortment impacts. One usually does not need to think about promotional impacts, as one aspect of the fashion allocation system is adjustment for promotions.

The group of items used to create a share is selected. This selection depends in part on the sales volume of the items being selected; fewer items are required when the sales volume is large. One trade-off worth considering is selecting enough items to avoid a profile that is driven by a few anomalistic events, but selecting a few enough items to avoid averaging away discernible selling differences. That is somewhat driven by the unit sales volume for the past items. For example, if particular styles or size splits have relatively predictable location selling differences, it is preferred to make sure that the shares created have those splits and not some higher level grouping that averages away those impacts.

The fashion allocation system allows the user to test shares after they are created, by running different alternative groupings and then evaluating whether those groupings show predictable differences over time. Typically, groupings are refined over time and change as consumer preferences and trends change. One strategy is to start with somewhat larger groupings and develop smaller groupings based on experience. Beginning with small groupings exposes the user to differences that are potentially anomalistic and not replicable. Choosing a broader grouping takes advantage of a function of the fashion allocation system that corrects differences between projected and real sales, as real sales results become available.

After selecting a reasonable set of comparable products, a time period should be selected to use for the share that is being created. It is useful to select the time period with the most representative sales. The fashion allocation system includes an option to make this decision less critical by using a sales type that fills stockouts. The system may compensate for stockouts throughout and at the beginning and end of the sales period, to avoid having a particular location underrepresented in the share calculation. Alternatively, a time period that ends before the best selling locations in the chain run out of the comparable products can be selected, or a combination of the two approaches.

Corrections may be made when historical data reflects stockouts of items. The number of historical corrections to be made depends on the quality of the data selected. Software can interact with a user in determining the stockout types present in the data and offers filling options. The user may decide whether to accept the default or to alter the default assortment fill weighting method. Alternatively, the software may select the fill method to be used.

Logic for correcting data by filling stockouts is illustrated in FIGS. 1 and 2. The system may provide for overriding any of the stockout types using straight or orphan logic. Both straight and orphan logic determine when sales start and stop (depending upon user specified parameters) and, as necessary, override in stock assessments. In FIGS. 1A and 1B, the data used by the system includes calendar date 101, whether or not stock was on hand 102, the sales on the specific date 103, the sales program starting date 104, and the sales program ending date 105. At the beginning of the program, for early sales, using the straight sales logic the system interprets the lack of sales 106 as a stockout condition. Although the on hand data 102 suggest that inventory was available for sale, the sales pattern suggests that the inventory was not on display. The system may present the user with options for filling the stockout period from Oct. 1 to Oct. 4, 1998 (labeled 106).

At the end of a sales program, the system interprets the lack of sales on Jan. 5, 2000, labeled 107, consistent with the on hand data 102 as indicating that the inventory stockout immediately followed the program close out date 105. In this example, a single sale 107 nearly two weeks after the earliest prior sale may be flagged by the system as a likely mistake in the data, which the user may choose to override. A threshold can be set to identify orphan sales which should be ignored for purposes of detecting stockouts at the beginning or end of a sales program, such as one or two units sold at a location separated from other sales by two or more days of no sales, at the beginning or end of the sales program.

Two different options for filling stockouts, average and profile filling, are graphically illustrated in FIG. 2. The average filling approach calculates the average sales for in stock days during each promotional period and then applies the calculated average to each day stocked out. The profile filling approach uses the stocked out day's percentage share, from a profile, to calculate the filled sales. If a user elects to use profile filling and the item is not associated with a profile, then a profile may be assigned for use or average filling can be used. Other forms of filling or other forms of average filling may be used, such as taking the sales for a number of days around the stockout day and using the average sales for those days.

An additional historical correction may apply when shares are based on an assortment of items, particularly when some of the locations did not stock all of the same products as other locations. This correction is called an assortment fill. Assortment fill applies to situations where the item was not stocked at a location; this is different from stockout filling which applies to individual days when an item stocked at a location was out of stock. FIG. 3 illustrates this. Cell 301 is blank because product 105423 was not stocked at some particular location. One option is to fill the cell, so that the total shares by location calculated and displayed in column 302 are not prejudiced by the assortment of goods carried at the particular location or by the group of products selected as a basis for calculating shares. The assortment fill function provides that locations that did not sell one or more of the items used to calculate a share will not be given an inappropriately low share.

The type of assortment fill weighting used may be selected when a user creates shares or profiles. Two different types of weighting include: unit sales and percent sales. Unit sales weighting is based on total units sold and is useful for large unit volume items. Percent sales weighting is based on the share for each item. Other forms of weighting may be used such as the dollar sales of each of the items. Selecting the best form of weighting for a situation can vary, for example if for a high volume item units may be the best approach while for a high price item dollars may be the best and for a typical item percent sales, but is important to generating a most representative weighting of the items.

While stockout corrections are presented in this example in the context of adjusting shares, the same method applies to adjusting reference profiles and to projections made from historical data impacted by stockouts.

Selection of the items of interest, the time period, the stockout type, the stockout filling, and the assortment filling selected primes the system to create shares. The shares algorithm typically is run for all of the locations for which an operator is responsible. Being over inclusive of locations does not distort the relative shares of a subset of the locations; being under inclusive requires that shares to be recalculated. Calculated shares are named. FIG. 4 is an example of calculated shares. Column 401 specifies location codes. Column 402 give names of locations. Column 403 gives unit fractions for specific locations. These unit fractions total 1.0.

III. Create Profiles

In the example described here, shares are created before profiles. However, these aspects of the present invention may be practiced separately or in a different order. In the course of setting up shares, most of the data has been collected to create profiles. The required data and resulting outputs are described in a table below. A profile is a set of historical data corresponding to day-by-day or more frequent sales. Typically, this set of data is stored as fractions adding to 1.0, where a daily sales fraction is the fraction of season unit sales that would occur on that day. Alternatively, actual sales volume can be stored, subject to scaling as necessary. Again, however the data is stored, the invention can readily be adapted to historical data retained for intervals more frequent than daily, for instance, for three shifts a day. Like shares, a profile may be determined for a group of items so that the location level sales do not reflect individual anomalistic situations. A user typically selects locations to group together which could, but does not have to, be all locations. Those groups should have similar time selling profiles and the group should be sufficiently large to overcome random selling noise but not so large as to blend together locations with different time selling.

A system embodying aspects of the present invention may provide utilities to generate a diagnostic profile output for an item or set of items and a number or all of the location locations. This is done by selecting the stockout type(s) and stockout fill. In addition, a share/profile weighting needs is selected. The diagnostic profile output provides a day-by-day unit sales profile for each of the locations specified, enabling a user to look for unexpected differences. Unexpected differences can to be evaluated to determine whether they are legitimate differences or result from anomalies. Diagnostic profiling facilitates grouping locations that have roughly similar profiles. Profiles can be run by group. Users may prefer to have fewer rather than more profiles, to evaluate the differences among profiles, and to make judgments about whether differences observed in the past will continue into the future. A sample output for a uniquely named profile is shown in FIG. 5. Column 501 lists dates covered by the profile. Column 502 is unit fractions for a profiled period, which add up to 1.0.

Profiles can be created based on more than one reference product or more than one reference profile. It may be useful to create a seasonality selling profile, distinct from the product selling profile. A general profile reflecting seasonal selling can be created based on sales of a group of more basic or non-seasonal items. Alternatively, it could be created based on sales of a group of non-promoted seasonal items. A reference selling profile can then divided by or ratioed to the general profile to give a seasonally adjusted product selling profile. A seasonally adjusted selling profile can usefully be applied to a different calendar period as a reference profile. Otherwise, days can be shifted to reflect differences in the calendar from year to year and time period to time period.

In addition to the creation of shares and profiles, a user typically works with the fashion allocation system to set up items and locations. However, the order in which the user carries out the steps described in this example is optional; many of the steps can be carried out in no particular order or in parallel.

The set up of items and locations for the fashion allocation system, typically is done once. Set up information should be modified when the sales program changes and when there are refinements to what is done. There are a number of settings that are done at the item level and that are done at the item/location level.

| INPUTS (OUTPUTS) | | |
|---|---|---|
| Input | Description | Considerations |
| Item level | | |
| Share | A share | Select an appropriate named share. |
| Share Group | Set of items used to make in-season share adjustments | Which items have similar selling characteristics |
| Available Buy | Quantity available for specified locations | The total buy for these locations |
| DC availability override | Quantity available for distribution | What will really be available |
| PQ distro minimum | Flag to specify whether to use PQ minimum or not | Whether you want each location to get a minimum of the PQ |
| Case distro minimum | Flag to specify whether to use case minimum or not | Whether you want each location to get a minimum of one case |
| Coverage index | Safety stock-like coverage factor varying by sales percentage | Balancing safety stock vs. liability of putting stock in wrong place |
| DC availability override | Override quantity for distribution in units | When you want to run a distro, distributing more stock than is in the DC |
| Location level | | |
| Profile | A profile | Select an appropriate profile for an item/location |
| In date | Date when item is ready for sale at location | In-location setup date |
| Out date | Date when item should be sold out | Plan |
| Pivot date | Date when specified item sell through desired | Whether there is some special timing driving the use of a pivot date |
| Pivot before percent | The percent sell through specified by the pivot date | Plan |

Following settings may apply at the item level. Because the same settings often apply for a group of items, the fashion allocation system may facilitate making settings for an entire group. For convenience, it may allow a user to make settings for a group and then go back and change the settings for exceptional items.

A user may select the item or items that they want to set up and specify a share to use, a share group to use, whether a PQ and/or purchase minimum is required, a coverage index to use, and whether a distribution center availability override is desired. Specifying the share typically involves selecting the name of a previously created share to be used. A share group is a set of items that are grouped together for in-season share determination purposes, for example the share group could be a single item, a single style, many items of the same size across a number of styles or a number of items or styles that share common characteristics. As with a share, specifying a share group involves selecting the name of a previously created share group.

Figure 6:
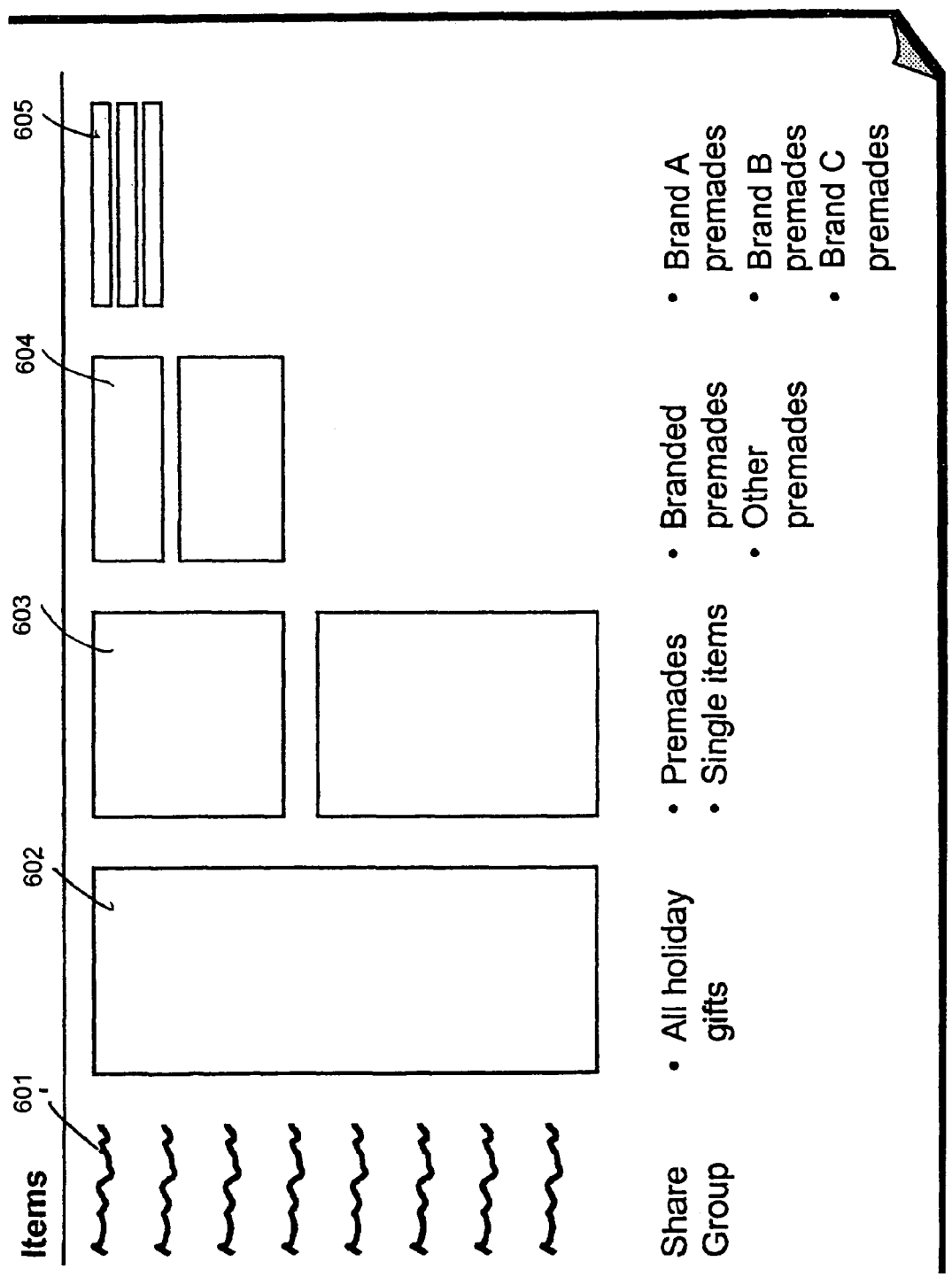
FIG. 6 graphically depicts a share group.

A share group serves an aggregation function similar to that of the share, constructed for group of items. FIG. 6 illustrates a hierarchical share group. Column 601 is a list of items in an overall share group. Column 602 symbolizes the highest categorical level of the share group. Column 603 subdivides column 602, as into premades and single items. Column 604 further subdivides part of column 603, separating premades into branded premades and other premades. Finally, column 605 further subdivides the column 604 branded premades into premades from Brand A, Brand B and Brand C.

Once in-season sales began, the fashion allocation system may be capable of modifying the share used in creating the model stocking level based on actual sales. This modification is applied by location. However, in cases where the selling quantities are relatively small at the location level, the system may avoid modification to the model stock based on a single item/location sales results. This may be avoided because the usual randomness of selling results in some locations selling a number of items quickly and others selling none; both of these events are within the expected range and variation of selling. Therefore, to quickly pick up real trends in selling, the system may to use a share group to look at a number of items selling in a location and make adjustments based on a share group, rather than a single item.

Upon completion of initial data input, a system practicing aspects of the present invention may prompt the user to specify for each location whether the location will receive a minimum of one case of product, the economic stocking level, the item/location specified PQ or the larger of the economic stocking level or specified PQ. This assumes that there enough units available to satisfy a selected minimum. However, if the minimum is not satisfied, the system should do its best to fulfill the requirement and then let the user know that there was insufficient available product. Then the system may attempt to fulfill the missing quantity next time that a distribution is run and continue to do so until the minimum is fulfilled.

A Coverage Index can be specified. The Coverage Index specifies a multiple of expected sales for the coverage cycle that will be distributed in the first allocation to the locations. It is similar to so called safety stock for basic goods; however, it does not function quite like safety stock, because all of the fashion goods in a sales program are intended to be distributed in a specific time period. Any so-called safety stock sent out early in the sales program serves as a cushion against sales occurring faster than expected, but also amounts to a potential liability for distributing stock to a slow selling location.

Figure 7:
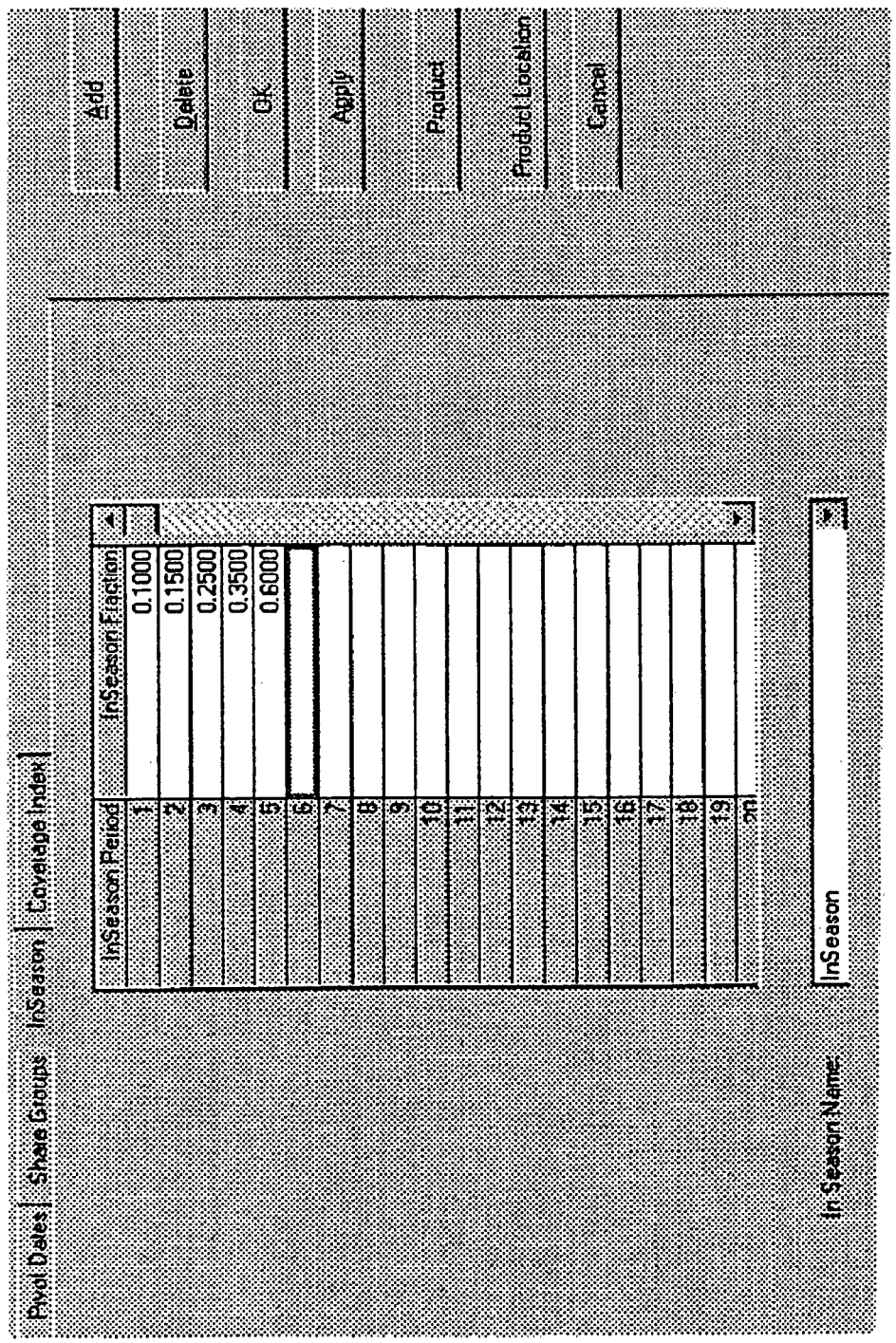
FIG. 7 illustrates an interface for entering or changing in season fractions or factors.

FIG. 7 illustrates an interface for entering or modifying in season fractions or factors. As actual sales results become available, the mix between relying on projections and actual sales may shift. In season fractions may automate the process of shifting this mix. FIG. 7 illustrates five different weighting factors applicable in five different in season periods. The in season periods may correspond to fractions of the planned period for a sales program or it may correspond to the fraction sold of the planned total buy or total planned sales volume. The weighting factors may be applied directly or according to a formula.

The fashion allocation system process also involves specifying a distribution center availability override, if applicable. A key distribution center override allows the user to run a distribution with a quantity greater what is available in the default distribution center.

Additional setups are done at the item and location level, which are sometimes referred to as location level setups.

Location setup can be done for a single item/location combination or it can be done for many combinations of the same time. If it is done for many, each of the many will get the same setup. In some instances, the quickest way to input certain settings may be to specify all of them at once and then edit the few exceptional items/locations. The user may proceed to set up and specify the profile to be used, a sales in date, a desired sales out date or close out date and, if the sales program includes it, a pivot date and pivot before fraction. Specifying the profile involves associating particular item(s) and location(s) with a profile. Specifying the sales in date is a matter of inputting the date when an item is expected to be in the location ready for sale. The out date is the date by which the item preferably is completely sold out this location. Finally, a pivot date is used in special event selling situations where the sales plan involves having sold a specified percentage of the goods by a specific date. Specifying a pivot date anchors a sales plan, so that the specified percentage of goods to be sold by the pivot date remains the same, even if the in or out dates change. For example, if it is preferred to have sold 90% of units of a product by Christmas day, then the Pivot Date would be December $24^{th}$ and the Pivot Before Fraction would be 0.9.

IV. Setup PQs and Causal Calendar

Presentation Quantities (PQs) may be set for each item, location, and time period. These PQs represent potential increases to the allocation quantities that would otherwise be calculated. The PQs are typically set to ensure that fixtures within locations are visually appealing with sufficient product on hand, presumably increasing customer propensity to buy. These PQs may be subject to a cap. Such a cap may be a proportion of the projected remaining sales, for the life of the sales program. Or, it may be a factor of the ratio of stock on hand at a location to projected remaining sales. Over time, such a cap naturally may be reduced, much as the reliance on actual sales as opposed to projected sales is increased over time. It is useful to reduce and eliminate the use of PQs for distribution as the end of a sale program approaches because stock on hand must drop below the PQs in order to sell out or close out the stock.

The causal calendar can identify historical or planned promotional events on an item, location, and time period basis, with the user analyzing sales lifts associated with historical promotional events or setting the expected sales lift associated with a planned event. For example, an item may be promoted with a 25% price discount from one date to another date in all locations, and this might result in an expect 100% increase in sales. These causal calendar entries will be used to adjust the projected sales profile at the location-item level. These adjustments can be made by historically based sales lift calculations, current in season selling lift calculations, a blend of historical and current calculations or different variants of specified values.

V. Run Distributions

The table below identifies some of the inputs and outputs that may be useful for running a distribution.

| ELECTRONIC INPUTS | |
| --- | --- |
| Sources | Data elements |
| Other elements | Shares |
| | Profiles |
| | Item and location setup |

| -continued | |
| --- | --- |
| | PQ and Casual Calendar |
| | Actual Results |
| Shipments | Item/location shipments so far |
| Shipment changes | Any discrepancies, transfers or other impact to item/location shipments |
| Actual | Actual unit sales for the item/location so far |

| USER INPUTS | |
| --- | --- |
| Inputs | |
| Distribution Date | When distribution will take place |
| First Distribution Flag | First distribution |
| Last Distribution Flag | Last distribution |
| Next Distribution Date | Date of next distribution (if this is not the last distribution) |

| OUTPUTS | |
| --- | --- |
| Element | Description |
| Item/location distribution | Quantity of goods to be sent to each location |

As the season progresses, the fashion allocation system may automatically react to actual sales and modify the distributions to reflect overall item and individual location sales trends. The fashion allocation system can be programmed to highlight major differences. Major differences may then be evaluated to determine whether the differences flagged indicate are a real trend that should be reacted to, or whether there are some extenuating circumstances. The system logic and resources can react automatically to trends; this automatic reaction may be tempered or overridden by a user when there are extenuating circumstances.

Using shares and profiles, PQ and causal calendar information, a system practicing aspects of the present invention can easily produce a distribution. To do so, the user sets up and names an activity. That activity specifies the items and locations to be included in the distribution. That activity is "run" and then saved for reuse. To run a saved activity, the user may simply specify the date of the intended distribution, whether that distribution is a first, last or intermediate distribution and if it is not the last distribution then the date of the next distribution. With these or a subset of these parameters, the distribution run can proceed.

The user specifies the reports to be printed for the distribution. Two typical reports include the Model Stock report (FIG. 8) and the Distribution report (FIG. 9). The Model Stock report includes key inputs and outputs for determining the item/location cumulative model stocks. The Distribution report then starts with the model stock and works through to the actual quantity for distribution to each location. An approved Distribution report may then be uploaded for distribution by a Distribution Center.

FIG. 8 shows a layout of the model stock calculated for multiple locations for a single item. The column for Location Number is the number assigned to the location by the retailer; Location Description is the description assigned to the location by the retailer; In Date is the first selling date of the item in the location; Out Dates may be the last intended selling date or the close out date of the item in the location; Activity Cycle End is the expected receipt date in the location of the distribution subsequent to the one for which the model stock is being calculated, or, alternatively, the out date if no more distributions are planned; Profile Name is the name that has been assigned by the retailer to the specific profile being used for the purpose of distribution; PQ is the presentation quantity assigned by the retailer for this item and location in order to ensure an aesthetically pleasing presentation; Plan Share Percent is the share for the location and item calculated in advance of the season. Group Sales Share Percent: the share for the location and item based on actual selling in-season; Interweave Share Percent is the Plan Share adjusted by the Sales Ratio (as defined in the distribution calculation described below.) This represents a weighting between the Plan Share and the Group Sales Share Percent depending on the Interweave Factor in effect. Cumulative Model Stock is the cumulative model stock for the item and location. Sales Thus far is sales to date for the item and location.

FIG. 9 is a Distribution Report that shows the actual distribution quantities calculated for location for a given item. In the report Location Number is the number assigned to the location by the retailer. Location Description is the description assigned to the location by the retailer. In Date is the first selling date of the item in the location. Out Date may be the last intended selling date or the close out duty of the item in the location. Activity Cycle End is the expected receipt date in the location of the distribution subsequent to the one for which the model stock is being calculated. Cumulative Model Stock is the cumulative model stock for the item and location. Previous Shipment is the quantity of the item that has already been shipped to this location. Desired Shipment is the desired shipment quantity to the location (equal to cumulative model stock less previous shipment). Case Rounded Shipment (Units) is the desired shipment constrained by rounding to the nearest integer case quantity or to the next larger integer case quantity but constrained by the total available to distribute. Case Rounded Shipment (Cases) is desired shipment as above, in cases as opposed to units. PQ Distro Minimum is user input flag, where Y indicates that any calculated shipment quantity will be overridden to ensure the distribution of a minimum of the presentation quantity for the location, item, and time, and N indicates that it will not be overridden. Case Distro Minimum is user input flag, where Y indicates that any calculated shipment quantity will be overridden to ensure the distribution of at least one case per location and N indicates that it will not be overridden. Insufficient PQ is a calculated flag, that indicates if the system was unable to satisfy the presentation quantity-needs in all locations.

The actual distribution quantity can be calculated to take into account the model stock, previous shipments to the location, such factors as transfers, sales and other factors impacting quantities available such as damaged and therefore non saleable items. The following formula is useful in calculating model stock:

$$\text{ModelStock} = \text{TotalBuy}_{item} \cdot (\text{Share}_{item,location}) \cdot (\text{Pfile}_{item,location,date1,date2}) \cdot (\text{SalesRatio}_{item,location}) \cdot (\text{CoverageIndex}_{\%\ sellthru}) + (\text{CappedPQ}_{item,location})$$

In this equation, $\text{TotalBuy}_{item}$ is equal to the total quantity of the item available to be sold during the entire length of the program. It may also be called the "buy quantity" or "total buy." $\text{Share}_{item,location}$ is equal to the share calculated for the specific item and location as described earlier. It represents the single location's expected selling quantity of the product as a fraction the total. $\text{Pfile}_{item,location,date1,date2}$ is equal to the sum of the daily profile quantities for the item and location from day1 to day2, where day1 is the date of the start of the item selling, frequently called the in date, and day2 is the receive date of the next distribution. (This formula and the invention can readily be adapted to historical data retained for intervals more frequent than daily.) For example, if the in date were November 1, the next distribution date were November 8, and the shipment would take five days to get to the location, then the Pfile would be equal to the sum of all the daily profiles from November 1 to November 13.

$\text{SalesRatio}_{item,location}$ is equal to $(\text{UnadjustedSalesRatio}_{item,location}) \cdot (1-\text{factor}) + (1 \cdot \text{factor})$, where the $\text{UnadjustedSalesRatio}_{item,location}$ is equal to the ratio of actual selling to projected sales. In cases where the sales ratio is calculated to be less than 1.0 the system, depending upon user specification or automatic set up, a user optionally may elect to use 1.0 instead of the smaller number. The rationale for that option would be that the selling is below plan but markdowns can and may be made on short notice to increase sales to the plan level and therefore distributions should anticipate that possibility and have sufficient goods out in the locations. When a distribution is run, the projected sales for a time period typically equals TotalBuy multiplied by the sum of daily profiles (fractions adding to 1.0) from the beginning of the program through the day prior to the distribution run. A factor, such as the in season factor, may be user specified as a function of sell-through or elapsed part of the planned selling period. At low sell-through levels, it is useful for the factor to approach 1.0, while at higher sell-though levels, it may be more useful for the factor to approach zero. This factor determines the relative weighting of planned sales to actual sales.

In the formula above, Coverage Index is an index typically specified by the user during user setup. During setup, the user can specify a range of coverage indexes that vary over time, for instance linked with the percent sell-through of the product. Typically, it is useful to start with higher values (e.g., 3) and then drop to 1 as the product approaches complete sell-through. $\text{CappedPQ}_{item,location}$ is equal to the desired presentation quantity set for the item and location for the time periods relevant for the distribution, but reduced such that the sum of the presentation quantity and the balance of the calculated distribution quantity does not exceed a fraction of remaining expected sales for the item and location for the balance of the program (as calculated by Total Buy·Share·Profile·SalesRatio).

A system practicing aspects of the present invention can automatically react to in-season selling results by altering the distribution of goods to match sales trends. For instance, when selling starts and the item moves faster than plan, the fashion allocation system can immediately adapt to the higher selling sales rate and increase the size of the next distribution to catch up. Since the fashion allocation system has a safety stock-like cushion built into its early distributions, usually an adaptation to a higher than projected sales rate can take place without sales disruptions.

The fashion allocation system also can react automatically to any changes in the causal calendar. When a user adds, subtracts or changes promotions, the impact on sales can be automatically reflected in subsequent distributions. Likewise, the fashion allocation system can automatically react to markdowns. In typical cases, a markdown is taken because sales have not met expectations, leaving more inventory in the locations than desired. Therefore, the markdown may be a "catch up" to move actual sales closer to planned sales. However, if it results in a faster than planned sales rate, the fashion allocation system can react at the next distribution and increase the flow of goods to compensate for the markdown actions. It also can alert the user to adjust additional scheduled markdowns.

A system practicing aspects of the present invention may be able to react to trends in in-season selling in two or more ways. First, if the Share Group Factor for an item and location is changing, the distributions can be increased or decreased to reflect that impact on the item/location Model Stock. That Share Group Factor will change if the items that constitute the Share Group are selling above or below plan. That trend in sales can be reflected in the calculation of Model Stocks. There is also a second mode applicable at the item and location level. If an item has sold more or less than planned to date, the specific difference can be added to or subtracted from its next distribution. In other words, if an item/location has sold 10 more than its plan to date then it will be shipped an extra 10 in its next shipment to replace those sold. However, this replacement should not necessarily be on a one-to-one basis, as such a reaction might result in an inordinate increase in model stock for that item and location. Response to changes in the Group Share Factor, instead of an individual items sales, can reduce over reactions to random sales events.

The system's capacity for automatic in-season changes makes it useful for users to exercise judgment and to make sure that anomalistic events do not precipitate unwanted, automatic changes.

Monitoring of in-season selling vs. planned selling is one way to test whether the user selected the right shares and profiles. Two indicators reported by the system are whether there are large differences in the plan versus actual location sales shares (usually measured for the share groups) and whether the week-by-week sales rate (relative to plan at the item level) is moving a great deal. If the Share Group Factor is moving a great deal for many if not all of the locations then the user may not have used the right share. The user may have selected a special event share when they should have used a more regular selling share or visa-a-versa. If that is the case, the system can easily be used to correct the error and rerun the distribution.

If the Share Group Factor is moving a great deal for a single location or a small number of locations, then the user may be alerted to check whether there has been some abnormal selling impact at those locations. Goods may have been delayed or set up early. Locations may have under or over presented the items. The user also may consider whether the right share was selected.

In addition, distributions may encounter shortages in product available to be distributed at the time desired. This may be during the middle of a sales program, while awaiting additional inventory, or at the end of the program. In the instance of shortages during the program, logic may be provided to best decide where to send the limited amount of goods. One logic provides for proportional shipping to each of the selling locations. Other logic may take into account case quantities the item(s), so that full cases are shipped, or for other user definable priorities such as filling the presentation quantities first. These factors can automatically be factored into the actual distribution quantity sent to each selling location.

VI. Markdown Manager Overview

The Markdown Manager includes aspects of the present invention which can assist the user in determining the timing and magnitude of markdowns of fashion and seasonal items, as they impact gross margin, profit, sell out date, remaining on-hand inventory or other measures of effectiveness.

Based on the sales profiles associated with items and locations during the fashion allocation system setup, Markdown Manager can create an array of potential markdown scenarios, based on the allowed markdown levels and markdown dates, and calculate revenue and other measures of effectiveness all or some of these scenarios. The scenarios are run for combinations of markdown levels and dates. These combinations can be specified by a user or generated automatically from lists of markdown levels and dates. Rules can be applied to the markdown levels, such as markdowns should become more attractive during the selling season, not less attractive. One or more scenarios may be reported. Typically, the markdown report produced by the Markdown Manager is then reviewed by merchants and planners to accept or adjust the specific system recommendations, and then the resulting markdown decisions are entered in the causal calendar.

Five activities comprise the Markdown Manager operation:
1. Select items and locations
2. Select markdown dates
3. Setup markdown discount percentages
4. Run Markdown Manager
5. Enter selected markdowns into the causal calendar In addition to the set up described above, item/locations may be associated with to pivot dates, which anchor markdown activities even if the in and out dates for a sales program are modified.

Figure 10:
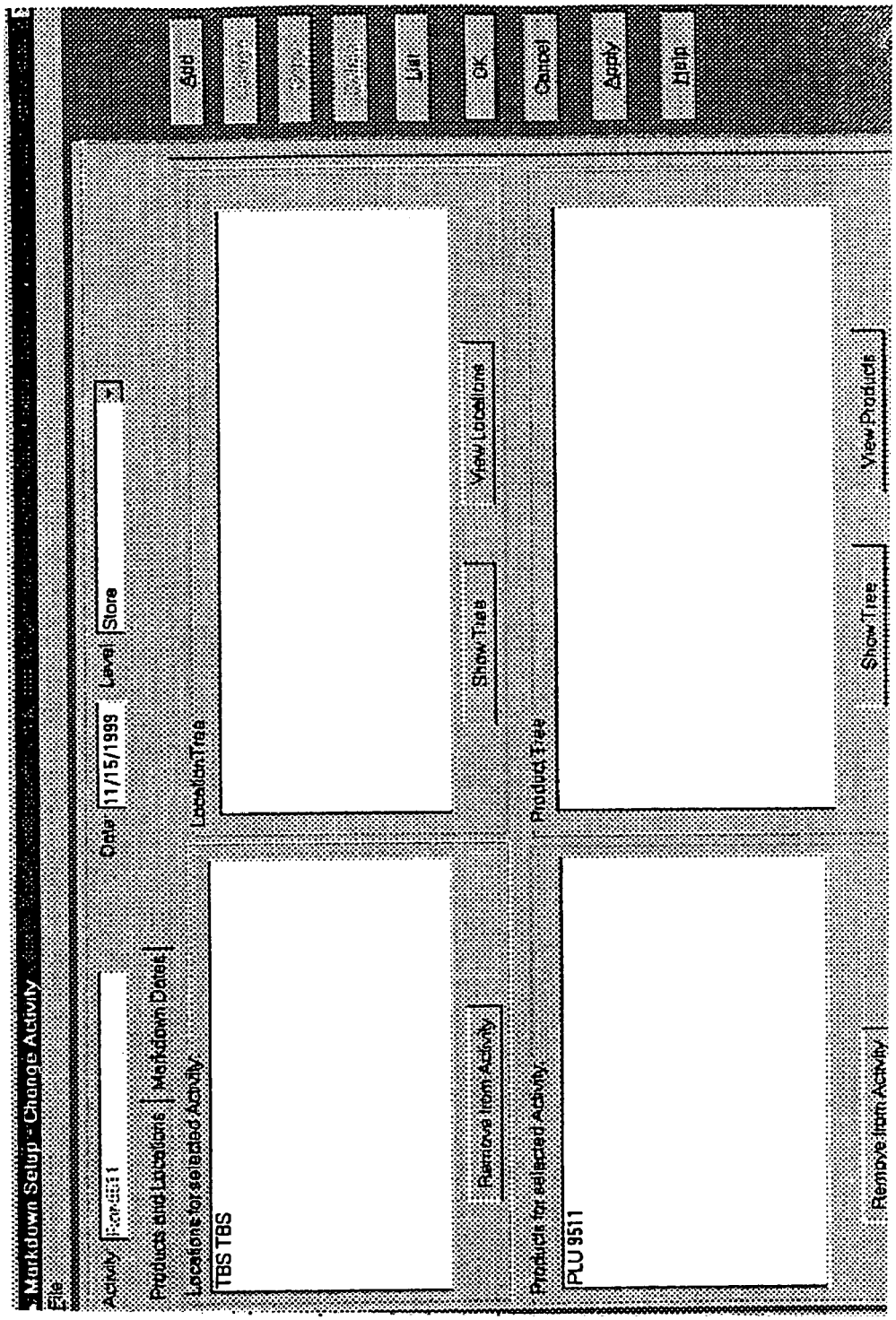
FIGS. 10 and 11 illustrates an interface is for setting changing markdowns.

Setting up a markdown activity includes selecting items and locations for which markdown scenarios will be generated and reviewed. An interface for doing this is depicted in FIG. 10. One option is for the Markdown Manager to generate scenarios using the same markdown for each product across all of the different locations; that is, so pricing is always constant from location to location. One input is a specification of the items and locations for running markdowns scenarios.

In many cases, a useful way to create a markdown activity may be to copy a fashion allocation system activity that was created for fashion distributions. If all of the fashion activity items are eligible for markdown at all of the locations to which the items were distributed, copying the existing activity may be substantially all that is required. If select items are not eligible for markdown, they may be removed from the markdown activity before or after copying. Even items ineligible for markdown can be included in a run in order to see what markdown recommendations emerge, because system recommendations can always be ignored.

Figure 11:
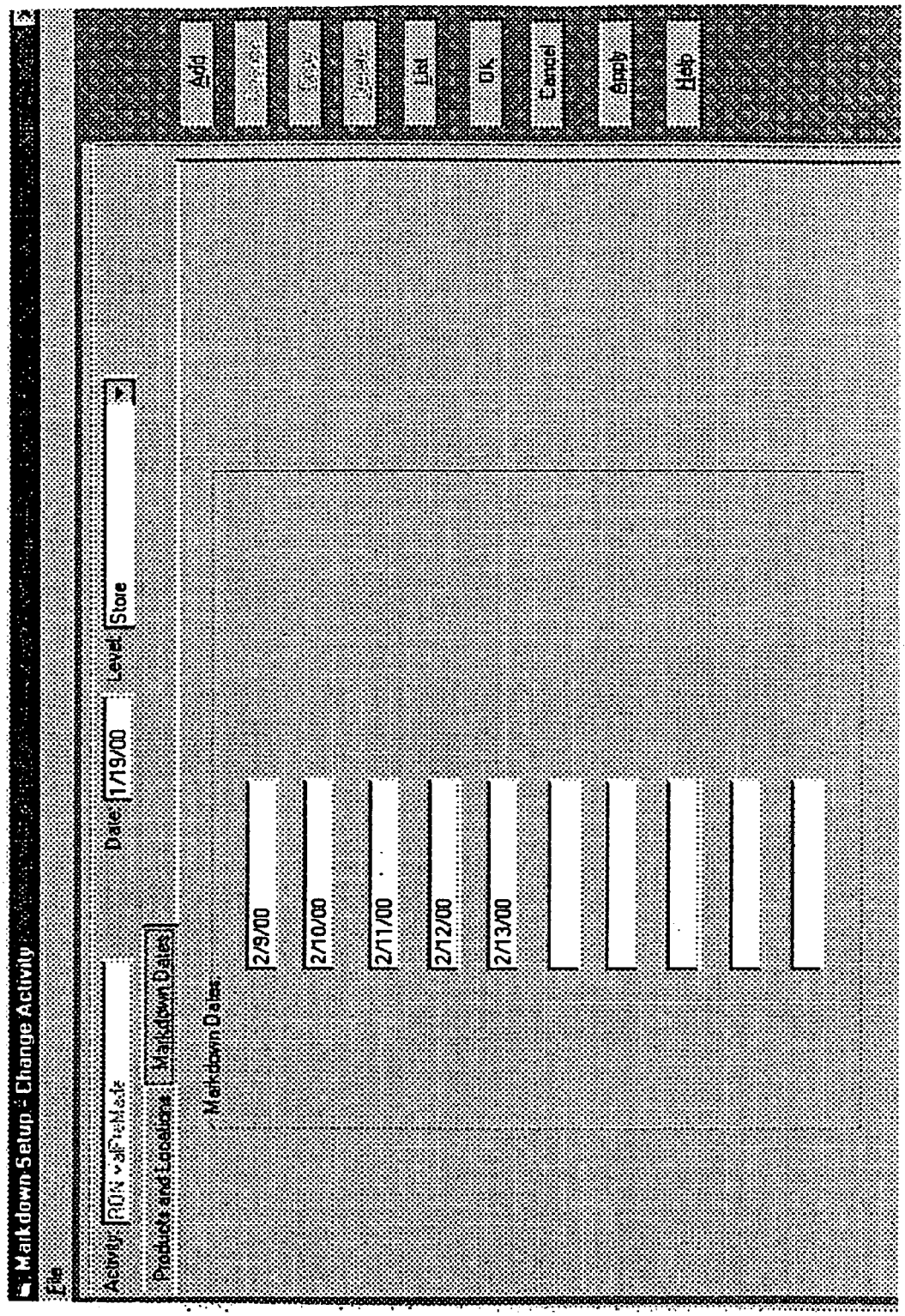

Setting up a markdown activity also includes specifying the eligible markdown dates. An interface for doing this is depicted in FIG. 11. These dates indicate to the system which days markdown actually may occur. The system can test all eligible markdown levels at each of these dates to generate potential markdown scenarios.

The eligible markdown dates should begin after the start date of the program and the last date should be before the conclusion of the program. For a Christmas program, for example, eligible markdown dates might include weekly Wednesday markdowns beginning the Wednesday before Thanksgiving and ending the Wednesday before Christmas. In this example, each of the Wednesday dates would be entered into the system. The system could then use those dates as potential dates to begin a markdown.

Figure 12:
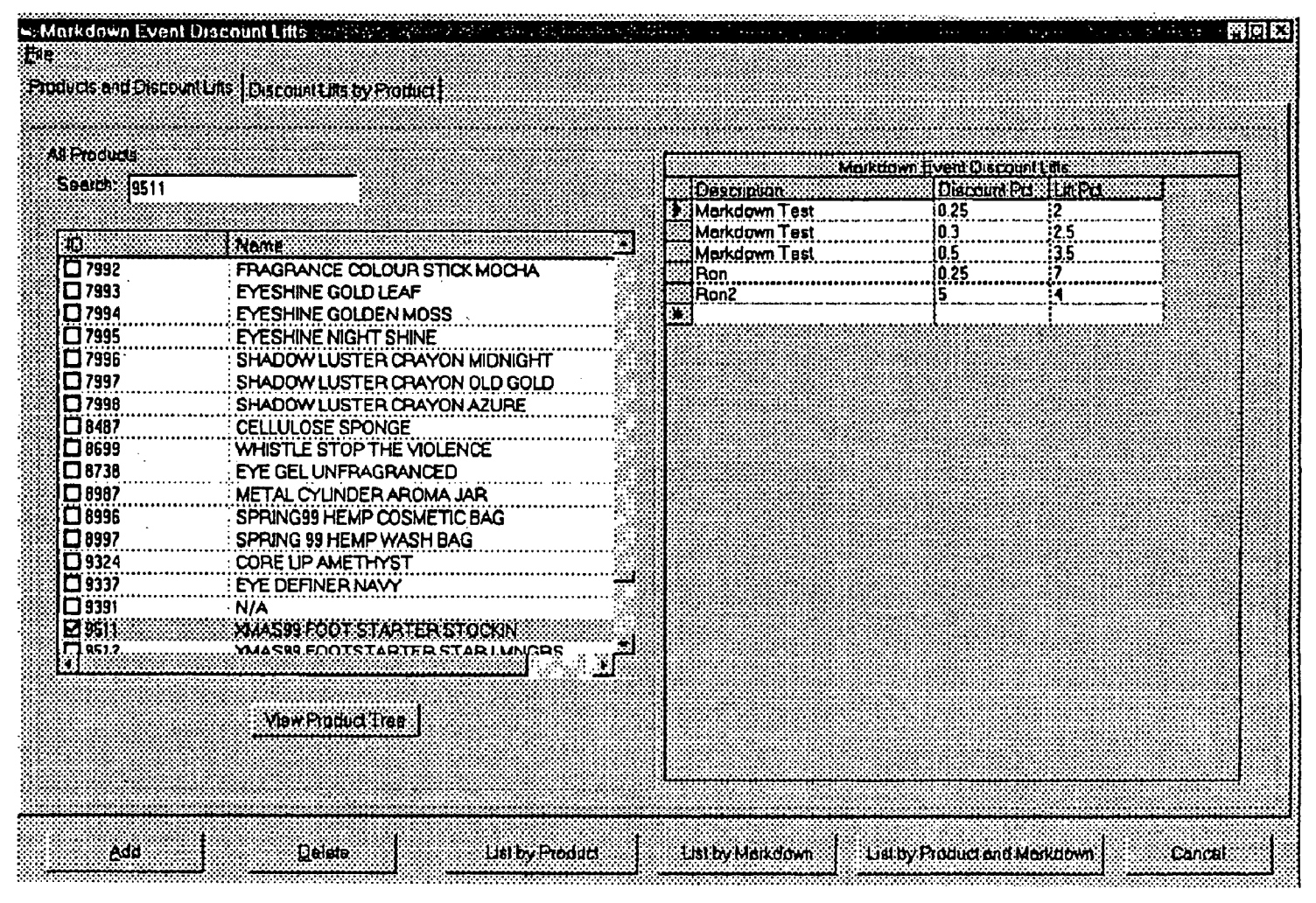

Preparing for a markdown run further includes associating items with potential markdown levels and associated sales lifts. An interface for doing this is depicted in FIG. 12. If the same potential markdown levels (e.g., −25% and −50%) apply to all products and the sales lift associated with each of these markdown levels is identical across all items, then all that is required may be entering and selecting these two price levels and then applying them to the entire product tree. If different potential markdown levels apply to different departments or even different items within the same department, then all of the markdown levels may be entered into the system and associated with the items. Alternatively, sales lift data can be stored in a library or database accessible to the user, so that a sales lift can be selected based on past experience.

The markdown levels specified for an item are the levels tested. For example, if the eligible markdown levels are −25% and −50%, then these are the levels that they system will recommend. In providing the recommendation, the system will determine the appropriate date (constrained by the set of dates specified in the activity) that the markdown should take place or if a markdown would be counter productive.

In one embodiment of the present invention, each markdown level is assigned a descriptive name (such as "25 off"), a discount percentage (0.75, in this case, to represent 25% off), and a lift percentage. The lift percentage indicates the sales acceleration generated by a markdown of this level. For example, a lift factor of 2.0 associated with a discount percentage of 0.75 indicates that a 25% off discount results in a sales multiple of 2.0. If different items respond differently to the same discount percentage, the same discount percentage can be entered multiple times in the table. For example, "25% off fragrance" and "25% off colorings" will both have a discount percentage of 0.75, but they may have different lift percentages. When matching markdown levels with items, the appropriate markdown discount and consequent lift should be selected.

A further aspect of the present invention is using the system to analyze and evaluate past sales results to determine the markdown lift percentages. This analysis can take the form of a graphical comparison of projections based on early actual sales versus historical actual sales after a markdown, or a more analytical lift percentage or factor.

With the setup activities complete, the Markdown Manager can be run. Typically, the Markdown Manager will be run one to three days in advance of each of the potential markdown dates, so that the results can be reviewed, the markdowns decisions made, and the decisions implemented on the markdown date.

FIGS. 13 and 14 illustrate how the Markdown Manager evaluates alternative scenarios. It first generates all valid scenarios of markdowns, based on all permutations of allowed markdown prices and allowed markdown dates. Scenarios where the price increases over time (caused by a larger markdown followed by a smaller markdown) may be excluded by a rule. Markdown Manager then calculates total revenue and the number of clearance units for each of the scenarios generated. One or more of the highest revenue scenario may be selected for inclusion in the markdown report. Other measures of effectiveness can be calculated and used as a criteria for inclusion in a report. FIG. 13 depicts how the markdown manager detects a short fall of actual sales, as compared to the a priori selling profile. Actual sales are represented by the line 1301. Actual sales information is available through today's date 1302. Potential markdown dates 1303, such as Wednesdays during the Christmas selling season, are entered into the system. The original selling profile 1304 is the reference for comparison against revised projected sales 1305 which can be adjusted to reflect actual sales through today's date. FIG. 14 depicts alternative sales profiles based on an array of alternative markdown strategies. The markdown dates are 1403A–1403C. The end of program "out date" by which all units are supposed to be sold is 1410. The scenarios in this figure are no markdown 1405, a 25 percent markdown 1406, a 25 percent markdown followed by a 50 percent markdown 1407, and a 50 percent markdown 1408. From the curves, it can be seen that much less than the entire stock 1409 will sell out if the no markdown strategy 1405 is followed. The entire stock will sell out early if a 50 percent markdown 1408 is offered early. Other strategies produce intermediate results. A report generated by the markdown manager quantifies the results shown graphically in these figures.

A markdown report on paper, displayed at a terminal or otherwise presented, can identify, for each item, the recommended markdown level at each of the specified markdown dates, a measure of profitability, a sell out date and a number of units left on hand after the close out date.

After the markdowns are reviewed and markdown decisions are made, these decisions can be implemented by entering them into the causal calendar so that future distributions and markdown analysis will reflect the decisions. For each markdown decision made, inputs should be made to reflect the item, the markdown level, and the effective dates. Once the markdown level and time period are entered into the causal calendar, the system will be able to appropriately calibrate selling performance for the next markdown and make the appropriate distribution recommendations.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims. Each method may readily be recast as a device or article of manufacture.

I claim:

1. A computer-implemented method for adjusting a retail location-product specific selling profile for a product, the computer-implemented method including:

collecting on machine-readable memory a multitude of retail location-product specific selling profiles that record daily or more frequent historical data for sales, the historical data reflecting at least random variations in sales, systematic variations in sales due to day of the week and day of the year, and systematic variations in sales due to any promotions benefiting the retail location;

maintaining on machine-readable memory a retail location promotions calendar that includes historical data that tracks promotion of the product at the retail location by effective dates and by type of promotion and a corresponding estimated systematic variation in sales caused by the type of promotion;

repeatedly for a plurality of products across a plurality of retail locations, retrieving the retail location-product specific selling profile for a selected historical period;

accessing the retail location promotions calendar data and identifying any promotions that benefited the retail location during the selected historical period; and automatically adjusting the historical data in the retail location-product specific selling profile to reflect the estimated systematic variation in sales caused by the promotions of the product at the retail location using at least the identified promotions from the retail location promotions calendar; and storing to machine-readable memory the automatically adjusted historical data.

2. The method of claim 1, wherein the promotions calendar identifies advertising of the product.

3. The method of claim 2, wherein the daily or more frequent historical data includes a stock on hand indicator, further including adjusting the historical data to correct for a stock out at the retail locations.

4. The method of claim 1, wherein the promotions calendar identifies a preferential display of the product.

5. The method of claim 4, wherein the daily or more frequent historical data includes a stock on hand indicator, further including adjusting the historical data to correct for a stock out at the retail locations.

6. The method of claim 1, wherein the promotions calendar identifies a price reduction applied to the product.

7. The method of claim 6, wherein the daily or more frequent historical data includes a stock on hand indicator, further including adjusting the historical data to correct for a stock out at the retail locations.

8. The method of claim 1, further including adjusting the historical data in the retail location-product specific selling profile to correct for seasonal selling effects.

9. The method of claim 8, wherein the adjusting to correct for seasonal selling effects includes rationing the retail location-product specific selling profile with an aggregate profile that includes historical data for non-promoted products.

10. The method of claim 9, wherein the non-promoted products are non-seasonal or basic products.

11. The method of claim 9, wherein the non-promoted products are seasonal products.

12. The method of claim 1, further including adjusting the retail location-product specific selling profile to correct for special selling days which impacted the historical data.

13. The method of claim 12, wherein the special selling days include one or more days preceding Valentines Day, Mothers Day, Memorial Day, the Fourth of July, Labor Day, Thanksgiving or Christmas.

14. The method of claim 12, wherein the special selling days include one or more days following Thanksgiving or Christmas.

15. The method of claim 12, wherein the special selling days include back to school days.

16. The method of claim 1, wherein the daily or more frequent historical data includes a stock on hand indicator, further including adjusting the historical data to correct for a stock out at the retail location.

17. The method of claim 16, wherein the adjusting to correct for the stock out includes evaluating the historical sales data and the stock on hand indicators for the location and correcting for lack of sales attributable to failure to display stock on hand.

18. The method of claim 16, wherein the adjusting to correct for the stock out includes evaluating the historical sales data and the stock on hand indicator for the location and filling in sales for days preceding first dates of sales for the location.

19. The method of claim 16, wherein the adjusting to correct for the stock out includes evaluating the historical sales data and the stock on hand indicator for the location and correcting for outlying sales at the location attributable to false indications of stock on hand.

20. The method of claim 16, wherein the adjusting to correct for the stock out includes evaluating the historical sales data and the stock on hand indicator for the location and filling in sales for days following final dates of sales, after excluding outlying sales at the locations.

21. The method of claim 1, wherein the retail location-product specific selling profile includes a group of retail locations selected to have similar sales patterns.

22. The method of claim 21, wherein the group is large enough to overcome random selling noise.

23. The method of claim 1, wherein the retail location-product specific selling profile includes a group of products selected to have similar sales patterns.

24. The method of claim 23, wherein the group is large enough to overcome random selling noise.

25. A computer-implemented method for adjusting a retail location-product specific selling profile for a product, the computer-implemented method including:
   collecting on machine-readable memory a multitude of retail location-product specific selling profiles that record daily or more frequent historical data for sales, the historical data reflecting at least random variations in sales, systematic variations in sales due to day of the week and day of the year, and occasional variations in sales due to a stock out condition at the retail location repeatedly for a plurality of products across a plurality of retail locations,
   retrieving at least one retail location-product specific selling profile that includes accumulated daily or more frequent historical data for at least one product;
   wherein the historical data includes a stock on hand indicator,
   adjusting the retail location-product specific selling profile to correct for a stock out by evaluating the historical sales data and the stock on hand; and
   storing to machine-readable memory the automatically adjusted historical data.

26. The method of claim 25, whereby the adjusting corrects for lack of sales attributable to failure to display stock on hand.

27. The method of claim 25, whereby the adjusting fills in sales for days preceding first dates of sales for the locations.

28. The method of claim 25, whereby the adjusting corrects for outlying sales at the locations attributable to false indications of stock on hand.

29. The method of claim 25, whereby the adjusting fills in sales for days following final dates of sales, after excluding outlying sales at the locations.

30. The method of claim 25, wherein the stock out is corrected using average sales levels.

31. The method of claim 25, wherein the stock out is corrected using profiled sales levels.

32. The method of claim 25, wherein a selection among types of out of stock corrections requires no user selection.

33. The method of claim 25, wherein a selection among types of out of stock corrections is made by a user.

34. A computer-implemented method for generating a projected location specific-retail sales profile for a particular product, the computer-implemented method including:
   collecting on machine-readable memory a multitude of retail location-product specific selling profiles that record daily or more frequent historical data for sales, the historical data reflecting at least random variations in sales, systematic variations in sales due to day of the week and day of the year, and systematic variations in sales due to any promotions benefiting the retail location;
   maintaining on machine-readable memory a retail location promotions calendar that includes historical data that tracks promotion of the product at the retail location by effective dates and by type of promotion and a corresponding estimated systematic variation in sales caused by the type of promotion;

repeatedly for a plurality of products across a plurality of retail locations, accessing at least one adjusted or unadjusted location specific-retail selling profile that includes accumulated daily or more frequent historical data for at least one product; and projecting a future sales profile by adjusting the location specific-retail selling profile to reflect sales lift from one or more promotions planned for the product and entered in the retail location promotions calendar using the at least one adjusted or unadjusted location specific-retail selling profile and the retail location promotions calendar; and storing to machine-readable memory the projected future sales profile.

35. The method of claim 34, wherein the product has a time period for sales, further including truncating the location specific-retail selling profile to a time period the same length as the time period for sales.

36. The method of claim 35, further including scaling historical data for the truncated location specific-retail selling profile so that the scaled sales profile projections sum to 1.0.

37. The method of claim 34, wherein the promotions have starting dates and ending dates and the starting dates and the ending dates are used in adjusting the location specific-retail selling profile.

38. The method of claim 37, wherein the promotions include advertising of the product.

39. The method of claim 37, wherein the promotions include a preferred display of the product.

40. The method of claim 37, wherein the promotions include a reduced price for the product.

41. The method of claim 34, wherein the promotions include advertising of the product.

42. The method of claim 34, wherein the promotions include a preferred display of the product.

43. The method of claim 34, wherein the promotions include a reduced price for the product.

44. A computer-implemented method of revising a plurality of retail location distribution shares for a particular product, taking info account planned promotions of the particular product, the computer-implemented method including:

collecting on machine-readable memory a multitude of retail location-product specific projected sales profiles that record daily or more frequent projected sales;

maintaining on machine-readable memory a retail location promotions calendar that includes planning data that tracks promotion of the product at the retail location by effective dates and by type of promotion and a corresponding estimated systematic variation in sales caused by the type of promotion;

repeatedly for a plurality of products across a plurality of retail locations, accessing a plurality of the projected sales profiles, by retail location, for a particular product;

automatically adjusting the projected sales profiles using at least the planning data from the retail location promotions calendar to reflect sales lift from one or more promotions planned, by retail location, for the particular product and entered in the retail location promotions calendar;

revising a plurality of location distribution shares based on the adjusted projected sales profiles.

45. The method of claim 44, wherein the promotions include advertising of the particular product.

46. The method of claim 44, wherein the promotions include a preferred display of the particular product.

47. The method of claim 44, wherein the promotions include a reduced price of the particular product.

48. A computer-implemented method of revising a plurality of location distribution shares for a particular product, taking into account planned promotions of the particular product, the computer-implemented method including:

collecting on machine-readable memory a multitude of retail location-product specific projected sales profiles that record daily or more frequent projected sales;

maintaining on machine-readable memory a retail location promotions calendar that includes planning data that tracks promotion of the product at the retail location by effective dates and by type of promotion and a corresponding estimated systematic variation in sales caused by the type of promotion;

repeatedly for a plurality of products across a plurality of retail locations, accessing a plurality of the projected daily or more frequent sales profiles, by retail location, and a plurality of retail location distribution shares, for a particular product; and automatically adjusting the retail location distribution shares using at least the planning data from the retail location promotions calendar to reflect a weighted mix of the projected daily or more frequent sales profiles and an actual daily or more frequent sales; and storing to machine-readable memory the automatically adjusted retail location distribution shares.

49. The method of claim 48, wherein the actual daily or more frequent sales are for a group of products.

50. The method of claim 48, wherein the weighted mix is calculated using weight=[(actual sales/projected sales)*(1−factor)]+(factor).

51. The method of claim 50, wherein the factor selected is between 0.0 and 1.0.

52. The method of claim 48, wherein the weighted mix is calculated proportional to an elapsed period of sales.

53. The method of claim 48, wherein the weighted mix is calculated proportional to actual sales divided by projected sales.

* * * * *